United States Patent
Ueshima et al.

(10) Patent No.: US 7,503,845 B2
(45) Date of Patent: Mar. 17, 2009

(54) GAME APPARATUS USING BODY IMAGE APPEARED SYNCHRONIZED WITH INSERTED BODY

(75) Inventors: Hiromu Ueshima, Shiga (JP); Kenichi Saitoh, Tokyo (JP)

(73) Assignee: SSD Company Limited, Shiga (JP)

( * ) Notice: Subject to any disclaimer, the term of this patent is extended or adjusted under 35 U.S.C. 154(b) by 276 days.

(21) Appl. No.: 10/947,059

(22) Filed: Sep. 22, 2004

(65) Prior Publication Data
US 2005/0107166 A1    May 19, 2005

(30) Foreign Application Priority Data
Sep. 22, 2003   (JP)   ............... P. 2003-329323

(51) Int. Cl.
*A63F 7/02*    (2006.01)
*A63F 13/04*   (2006.01)
*A63F 13/06*   (2006.01)
*A63F 7/24*    (2006.01)
*A63F 7/30*    (2006.01)
*A63F 7/38*    (2006.01)
*A63F 9/02*    (2006.01)
*A63F 9/30*    (2006.01)

(52) U.S. Cl. .................. 463/3; 463/7; 463/16; 463/20; 463/31

(58) Field of Classification Search .......... 446/8–13, 446/3, 1–5; 273/138.1, 141 R, 141 A, 142 R, 273/143 R, 143 A, 143 B, 121 R, 121 A, 273/121 B, 108; 463/2, 3, 5, 7, 25, 30–32, 463/36–38, 16, 20; 235/91, 91 B; 194/30, 194/41, 55

See application file for complete search history.

(56) References Cited

U.S. PATENT DOCUMENTS

| | | | | | |
|---|---|---|---|---|---|
| 1,431,013 | A | * | 10/1922 | Larson | 278/86 |
| 1,788,210 | A | * | 1/1931 | Staar | 273/108.52 |
| 3,797,828 | A | * | 3/1974 | Ishikawa et al. | 273/126 R |
| 3,874,669 | A | * | 4/1975 | Ariano et al. | 463/4 |
| 3,997,045 | A | * | 12/1976 | Yeung | 194/339 |
| 4,006,474 | A | * | 2/1977 | Lukkarila | 463/3 |
| 4,076,243 | A | * | 2/1978 | Davis | 273/108.55 |

(Continued)

FOREIGN PATENT DOCUMENTS

CA    2 456 940 A1 * 12/2003

(Continued)

OTHER PUBLICATIONS

Wikipedia articles for "Breakout," "Pong," and "Tempest," downloaded from www.wikipedia.org on Aug. 15, 2006.*

(Continued)

*Primary Examiner*—Xuan M Thai
*Assistant Examiner*—Matthew D. Hoel
(74) *Attorney, Agent, or Firm*—Osha • Liang LLP

(57) ABSTRACT

A coin image simulating a coin is displayed on a television monitor synchronized with the insertion of the coin from a coin insertion portion. The coin image moves on the television monitor. When a predetermined requirement is fulfilled, the coin is paid out from a coin ejection opening. An operating object image displayed on the television monitor can be controlled with a handle that is rotatable in clockwise and counterclockwise directions.

18 Claims, 22 Drawing Sheets

U.S. PATENT DOCUMENTS

| | | | | |
|---|---|---|---|---|
| 4,371,071 | A * | 2/1983 | Abedor et al. | 194/212 |
| 4,448,417 | A * | 5/1984 | Clark et al. | 273/121 A |
| 4,521,020 | A * | 6/1985 | Uemura et al. | 463/3 |
| 4,746,319 | A * | 5/1988 | Zwieg et al. | 453/32 |
| 4,820,162 | A * | 4/1989 | Ross | 434/45 |
| 4,933,099 | A * | 6/1990 | VerStrate | 508/312 |
| 4,933,670 | A * | 6/1990 | Wislocki | 345/167 |
| 5,071,127 | A * | 12/1991 | Bromley et al. | 273/108.1 |
| 5,171,013 | A * | 12/1992 | Dooley | 273/118 A |
| 5,275,402 | A * | 1/1994 | Malavazos et al. | 273/138.2 |
| 5,370,399 | A * | 12/1994 | Liverance | 463/23 |
| 5,507,490 | A * | 4/1996 | Hagiwara | 463/16 |
| 5,667,217 | A * | 9/1997 | Kelly et al. | 273/126 R |
| 5,752,699 | A * | 5/1998 | Crompton et al. | 273/138.2 |
| 5,951,398 | A * | 9/1999 | Yamamoto et al. | 463/37 |
| 6,020,875 | A * | 2/2000 | Moore et al. | 345/156 |
| 6,050,897 | A * | 4/2000 | Suzuki et al. | 463/37 |
| 6,070,205 | A | 5/2000 | Kato et al. | |
| 6,071,192 | A * | 6/2000 | Weiss | 463/31 |
| 6,283,859 | B1 * | 9/2001 | Carlson et al. | 463/36 |
| 6,306,041 | B1 * | 10/2001 | Mendes, Jr. | 463/59 |
| 6,509,901 | B1 * | 1/2003 | Miura | 345/573 |
| 6,575,836 | B1 * | 6/2003 | Nishimura | 463/46 |
| 7,128,644 | B2 * | 10/2006 | Linzey | 463/1 |
| 7,267,615 | B2 * | 9/2007 | Rodden et al. | 463/30 |
| 2001/0046897 | A1 * | 11/2001 | Hagiwara et al. | 463/37 |
| 2002/0098880 | A1 * | 7/2002 | Rodden et al. | 463/2 |
| 2003/0024790 | A1 * | 2/2003 | Quattrini et al. | 194/217 |
| 2003/0087687 | A1 * | 5/2003 | Locke et al. | 463/20 |
| 2005/0064936 | A1 * | 3/2005 | Pryor | 463/36 |

FOREIGN PATENT DOCUMENTS

| | | | |
|---|---|---|---|
| DE | 196 36 231 C1 * | 9/1997 | |
| EP | 0 056 315 A1 * | 7/1982 | |
| JP | 7-275417 | * | 10/1995 |
| JP | 8-309023 A | * | 11/1996 |
| JP | 11-114221 A | * | 4/1999 |
| WO | WO 97/05581 | | 2/1997 |

OTHER PUBLICATIONS www.klov.com/game_detail.php?letter=A&game_id=6916, downloaded Feb. 9, 2007, cites 1980s arcade game Arkanoid using an encoder on its paddle controller.*
International Search Report for WO 03/105976 A1.*
International Search Report for WO 2006/092813 A1.*
Machine translation of parent application JP 2003-329323 P.*
Coin Hopper Abstract of JP2001283275 from esp@cenet document view (1 page.
Abstract of Japan Unexamined Patent Publication No. 57-180982 (1 page).
Game Apparatus Abstract of JP6285262 from esp@cenet document view (1 page).
Full English translation of Japanese Utility Model No. 3098424 published Oct. 1, 2003, 23 pages.
Full English translation of Japanese Publication No. 6-285262 published Oct. 11, 1994, 17 pages.
Partial English translation of Japanese Publication No. 57-180982 published Nov. 8, 1982, 1 page.
Full English translation of Japanese Publication No. 2001-283275 published Oct. 12, 2001, 13 pages.

* cited by examiner

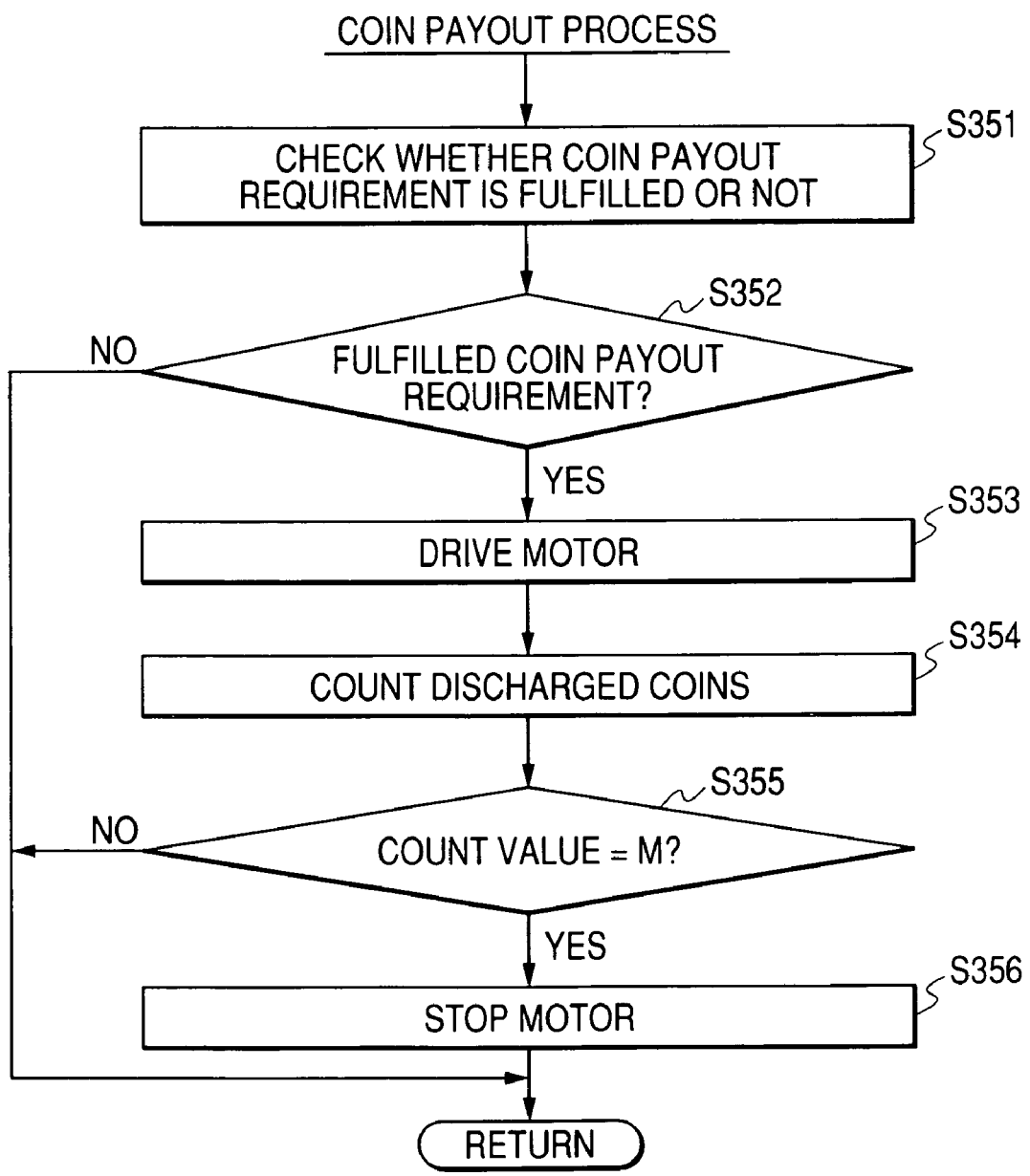

GAME APPARATUS USING BODY IMAGE APPEARED SYNCHRONIZED WITH INSERTED BODY

This application claims foreign priority based on Japanese Patent application No. 2003-329323, filed Sep. 22, 2003, the contents of which is incorporated herein by reference in its entirety.

BACKGROUND OF THE INVENTION

1. Field of the Invention

The present invention relates to a game apparatus that is used while connected to a display device, and more particularly to a game apparatus using a disk body.

2. Description of the Related Art

Conventionally, there exists a coin game apparatus that is used while connected to a television monitor.

For example, the conventional coin game apparatus is provided with three decision buttons. Three drum images displayed on the television monitor rotate when a coin is inserted. When a player pushes any one of the decision buttons, the corresponding drum image stops rotating. When all the three drum images stop and then show a predetermined pattern, the coin is paid out.

This conventional coin game apparatus is vastly different from a slot machine installed at a gaming hall in that the coin game apparatus itself does not have a drum unit but the drum images are displayed on the television monitor. Consequently, this makes it possible to provide an inexpensive game apparatus using the coin, whereby a game using the coin can be easily enjoyed even at home.

Since this conventional coin game apparatus simulates a slot machine, it is intended for enjoying the event that the coin is paid out when the pattern appears. Accordingly, insertion of the coin is merely a requirement for game starting and has no relation to the content of the game.

Besides, since this conventional coin game apparatus simulates a slot machine, it is only the decision button that the player can operate. Accordingly, a content of a game program that can be installed thereon is limited. Generally, a user desires to play as many kinds of games as possible on one game apparatus.

SUMMARY OF THE INVENTION

Therefore, one object of the invention is to provide a game apparatus using a disk body, which can be more enjoyed by providing relevance between the insertion of the disk body and the content of a game.

Besides, another object of the invention is to provide a game apparatus using a disk body, which can be more enjoyed by enabling to perform a larger number of kinds of games.

According to a first aspect of the invention, the game apparatus is a game apparatus using a separate display device and a disk body, said game apparatus comprising a processor operable to execute a game program, a disk body insertion unit into which the disk body is inserted by a player, a disk body insertion detection unit operable to detect that the disk body is inserted through the disk body insertion unit, a disk body storage unit operable to store the disk body therein, and a payout mechanism operable to pay out the disk body which is stored in the disk body storage unit when a predetermined requirement is fulfilled, wherein the processor displays a first object image which is simulating the disk body on a screen of the display device synchronized with a detection of the insertion of the disk body by the disk body insertion detection unit, and controls the movement of said first object image in accordance with the game program.

According to this configuration, the first object image simulating the disk body is displayed on the screen synchronized with the insertion of the disk body by the player. Then, the first object image moves on the screen. Furthermore, the disk body is paid out when a predetermined requirement is fulfilled. Thus, a game is executed with the real world and the game world closely related to each other in a manner that the real disk body is inserted, the first object image simulating the real disk body moves, and the real disk body is paid out. Consequently, the player can be more immersed in the game and can further enjoy the game.

Here, generally when all the steps are executed in a real world in a manner that the real disk body is inserted, the real disk body moves, and the real disk body is paid out, then the game apparatus becomes large in scale. Therefore, the price increases and the device itself increases in size, so that an individual cannot easily purchase the game apparatus and the game cannot be easily enjoyed at home.

In this light, according to the game apparatus of the invention, it is possible to easily enjoy the game adopting the movement of the disk body, though the disk body is an image.

The game apparatus further comprises an operating information input unit that is rotatable in both clockwise and counterclockwise directions by the operation of the player, wherein the processor controls the movement of a second object image displayed on the screen corresponding to the rotation of the operating information input unit.

According to this configuration, the player can operate the second object image using the rotatable operating information input unit. Therefore, this makes it possible to install a larger number of kinds of game programs as compared with when the player can operate the decision button only. As a result, it is possible to provide the game apparatus using the disk body, which can be more enjoyed by the player.

A game apparatus further comprises a guide member that is connected to an opening provided in a lower portion of the disk body storage unit, and a disk body ejecting detection unit operable to detect that the disk body is ejected from the opening to the guide member, wherein said disk body ejecting detection unit is further comprising a first light emitting element operable to emit light and a first light receiving element operable to detect the light emitted by the first light emitting element, said first light emitting element and said first light receiving element being disposed in the guide member so that the light from the first light emitting element is blocked by the side face of the disk body inserted, and further wherein the disk body insertion detection unit is comprising a second light emitting element operable to emit light and a second light receiving element operable to detect the light emitted by the second light emitting element, said second light emitting element and said second light receiving element being disposed in the disk body insertion unit so that the light from the second light emitting element is blocked by the side face of the disk body inserted.

According to this configuration, the side face of the disk body is detected, thus enabling an improvement in the accuracy of detection of the disk body.

In the game apparatus, furthermore, a disk body uprise prevention member operable to prevent an uprising of the disk body is disposed in a lower portion of the disk body storage unit.

According to this configuration, uprising of disk body is prevented, thus making it smooth to convey the disk body to the opening of the disk body storage unit, so that the disk body can be smoothly ejected outside.

In the game apparatus, the processor includes a graphic processor operable to generate the first object image and the second object image, which is supplied with storage position information of image data for generating the first object image and with storage position information of image data for generating the second object image during each time of a video blanking period, said graphic processor reading the image data stored in positions indicative of the respective storage position information, and then generating the first object image and the second object image.

According to a second aspect of the invention, the game apparatus is a game apparatus using a separate display device and a disk body, said game apparatus comprising a processor operable to execute a game program, a disk body insertion unit into which the disk body is inserted, a disk body storage unit operable to store the disk body therein, a payout mechanism operable to pay out the disk body stored in the disk body storage unit, when a predetermined requirement is fulfilled, and an operating information input unit that is rotatable in both clockwise and counterclockwise directions by an operation of a player, wherein the processor controls the movement of an object image displayed on a screen of the display device, corresponding to the rotation of the operating information input unit.

According to this configuration, player can operate the object image using the rotatable operating information input unit. Therefore, this makes it possible to install a larger number of kinds of game programs as compared with when the player can operate the decision button only. As a result, it is possible to provide the game apparatus using the disk body, which can be further enjoyed by the player.

The novel features of the invention are set forth in the appended claims. However, the invention itself and other features and advantages thereof will be readily understood by reading the detailed description of the specific embodiment with reference to the accompanying drawings.

BRIEF DESCRIPTION OF THE DRAWINGS

FIG. 29 is a flow chart showing a flow of coin payout process in step S35 of FIG. 25.

DESCRIPTION OF THE PRFERED EMBODIMENTS

Figure 1:
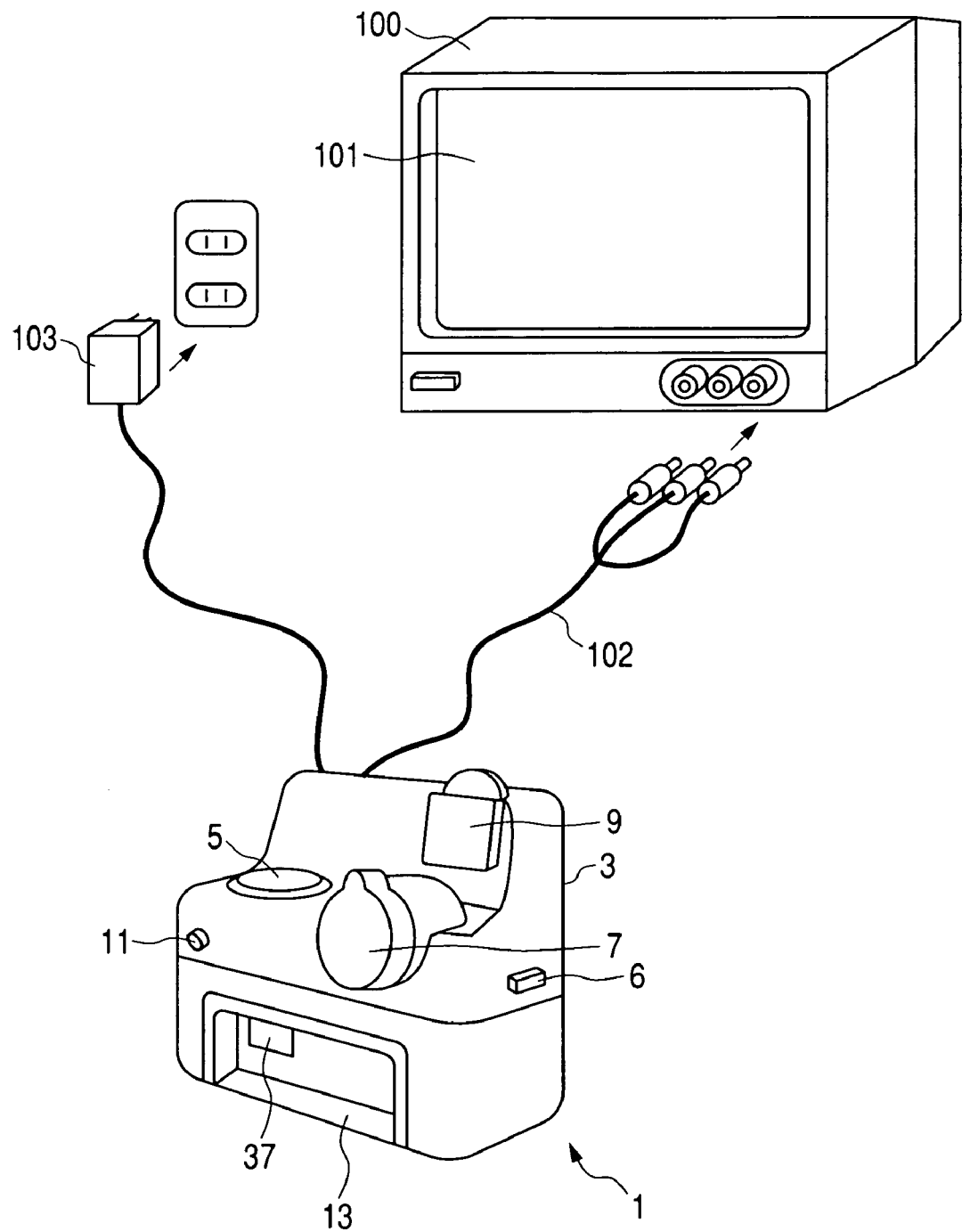
FIG. 1 is a view showing an overall configuration of a game system according to an embodiment of the invention.

An embodiment of the invention will hereinafter be described with reference to the drawings. Additionally, in the figures of the drawings, similar or corresponding parts are indicated by the same reference numerals to quote the description thereof.

FIG. 1 is a view showing an overall configuration of a game system according to the embodiment of the invention. As shown in FIG. 1, the game system comprises a game apparatus 1 and a television monitor 100.

The game apparatus 1 includes a housing 3. The housing 3 is provided with a decision button 5, a handle 7, a coin inserting portion 9, a power switch 6, and a cancel button 11, and furthermore formed with a coin ejection opening 13.

The game apparatus 1 and the television monitor 100 are connected together by an AV cable 102. Furthermore, an AC adaptor 103 supplies a DC power voltage to the game apparatus 1. However, a battery, which is not shown, instead of the AC adaptor 103 may supply the DC power voltage to the game apparatus 1. Additionally, a screen 101 is disposed at the front of the television monitor 100.

Figure 2:
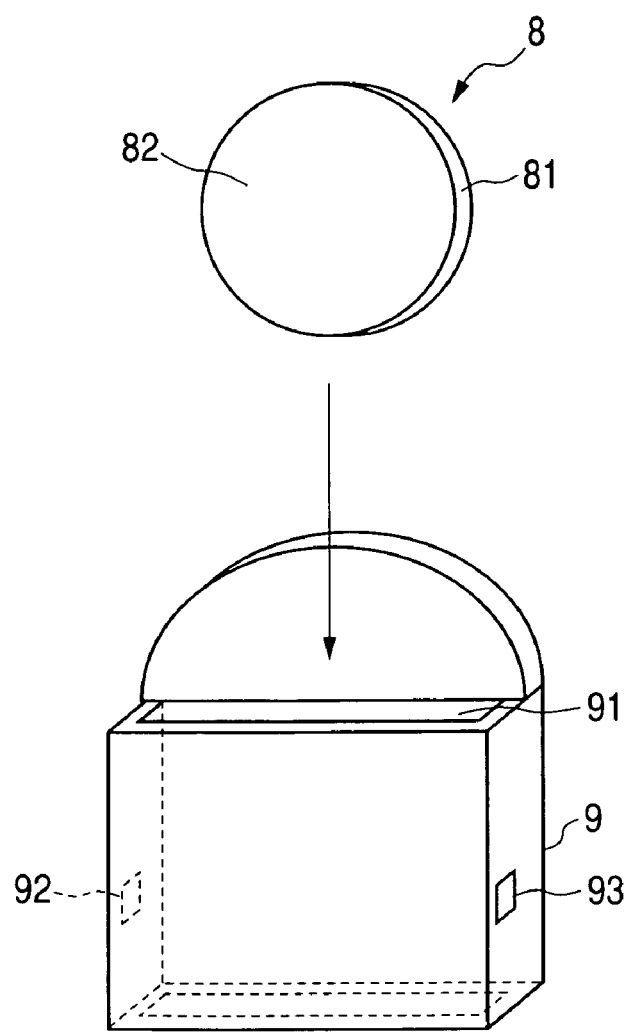
FIG. 2 is a perspective view of a coin inserting portion of a game apparatus in FIG. 1.

FIG. 2 is a perspective view of the coin inserting portion 9 of the game apparatus 1 in FIG. 1. As shown in FIG. 2, the coin inserting portion 9 has a coin insertion opening 91. Further, a photodiode 92 and a phototransistor 93 are disposed in the coin inserting portion 9 so as to sandwich a path extending from the coin insertion opening 91.

When a coin 8 is inserted into the coin insertion opening 91, light emitted by the photodiode 92 is thereby blocked for an instant. The phototransistor 93 detects the light blocking, thereby making it possible to detect that the coin 8 has been inserted. Thus, the number of coins 8 inserted is counted.

In this case, a side face 81 of the coin 8 blocks the light, thus providing the following advantage as compared with when a front face 82 of the coin 8 blocks the light. That is, with such a configuration that the front face 82 of the coin 8 blocks the light, when the coin 8 formed with a through-hole is inserted, the phototransistor 93 detects the light blocking for a plurality of times, even when one coin 8 is inserted. Thus, the accurate number of coins 8 inserted may not be detected. With such a configuration that the side face 81 of the coin 8 blocks the light, such trouble can be avoided.

Figure 3A:
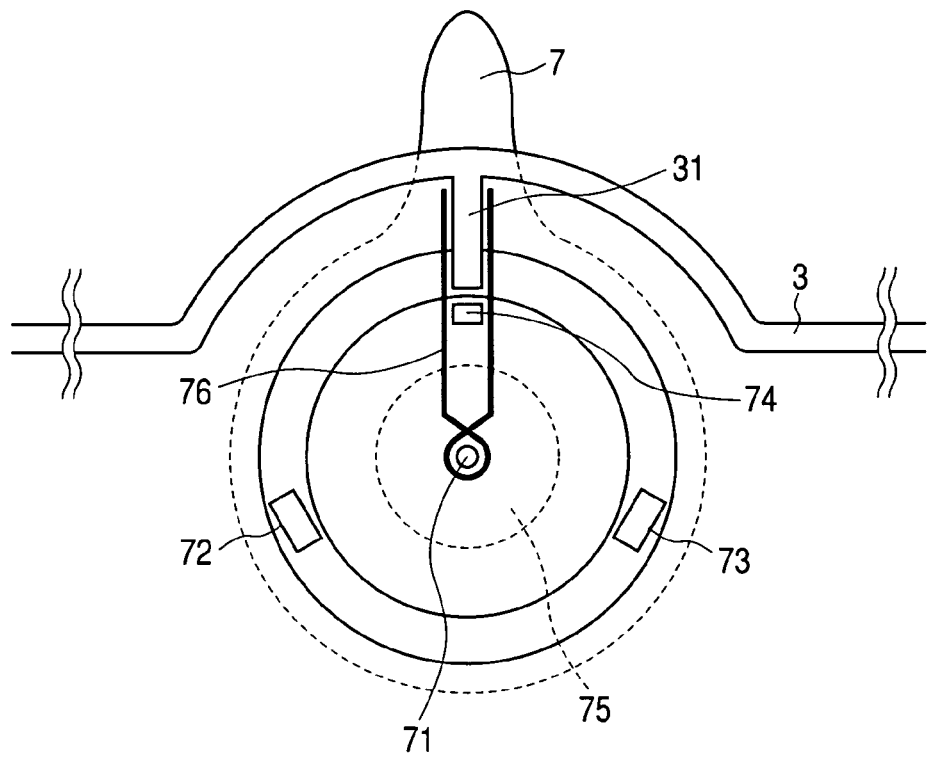
FIG. 3A is a view of a structure of the handle in FIG. 1 as seen from inside a housing, showing a state in which the handle is positioned in a reference position.
Figure 3B:
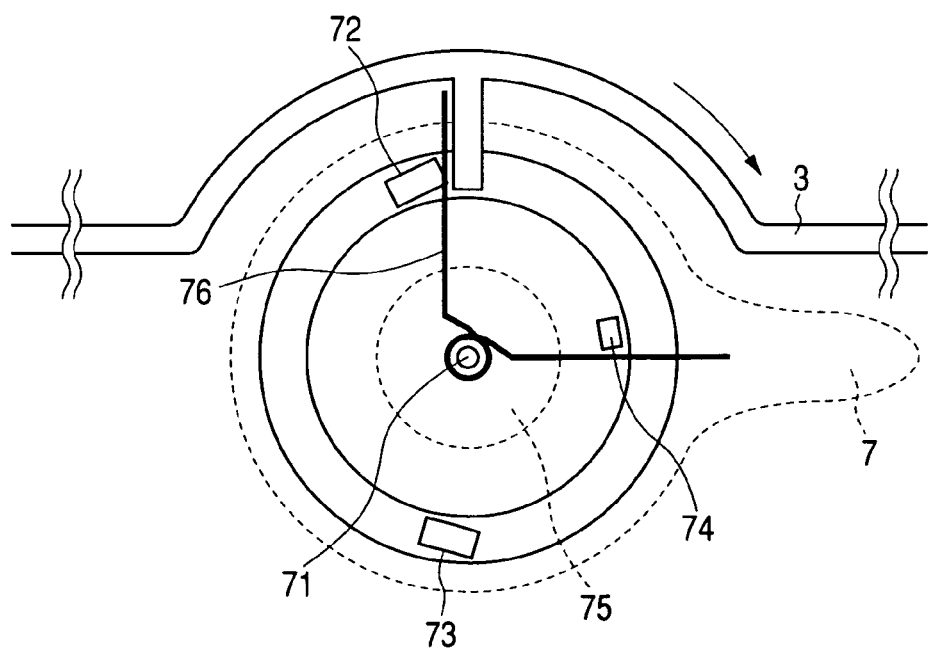
FIG. 3B is a view of the structure of the handle in FIG. 1 as seen from inside the housing, showing a state in which the handle is rotated ninety degrees counterclockwise.

FIG. 3A is a view of a structure of the handle 7 in FIG. 1 as seen from inside the housing 3, showing a state in which the handle 7 is positioned in a reference position. FIG. 3B is a view of the structure of the handle 7 in FIG. 1 as seen from inside the housing 3, showing a state in which the handle 7 is rotated ninety degrees counterclockwise. Here, the term "counterclockwise" refers to a counterclockwise direction seen from outside the housing 3.

As shown in FIG. 3A, a central portion of the rear face of the handle 7 is formed with a circular column-like projection 71 projecting perpendicular to the plane of the figure, a plate-like projection 74 projecting perpendicular to the plane of the figure, and square column-like projections 72, 73 projecting perpendicular to the plane of the figure. Besides, a stopper 31 is formed on the housing 3 so as to extend downward.

A torsion spring 76 made of metal is attached to the projection 71. Further, a bonding plate 75 is attached to the projection 71. This prevents the torsion spring 76 from coming off the projection 71.

Suppose that a player rotates the handle 7 positioned in the reference position in FIG. 3A, for example, in a counterclockwise direction as shown in FIG. 3B. In this case, the projection 72 can be rotated until stopped by the stopper 31. Similarly, the projection 73 can be rotated clockwise until stopped by the stopper 31. Accordingly, the positions of the projections 72, 73 define the maximum rotation angle of the handle 7.

Besides, with the handle 7 being rotated, one end of the torsion spring 76 is fixed by the stopper 31, and the other end thereof is pushed by the projection 74, thereby opening the torsion spring 76. Accordingly, when the player releases the handle 7, the handle 7 returns to the reference position by the elastic force of the torsion spring 76. In addition, the position of the torsion spring 76 in FIG. 3A is referred to as a closed position.

Figure 4:
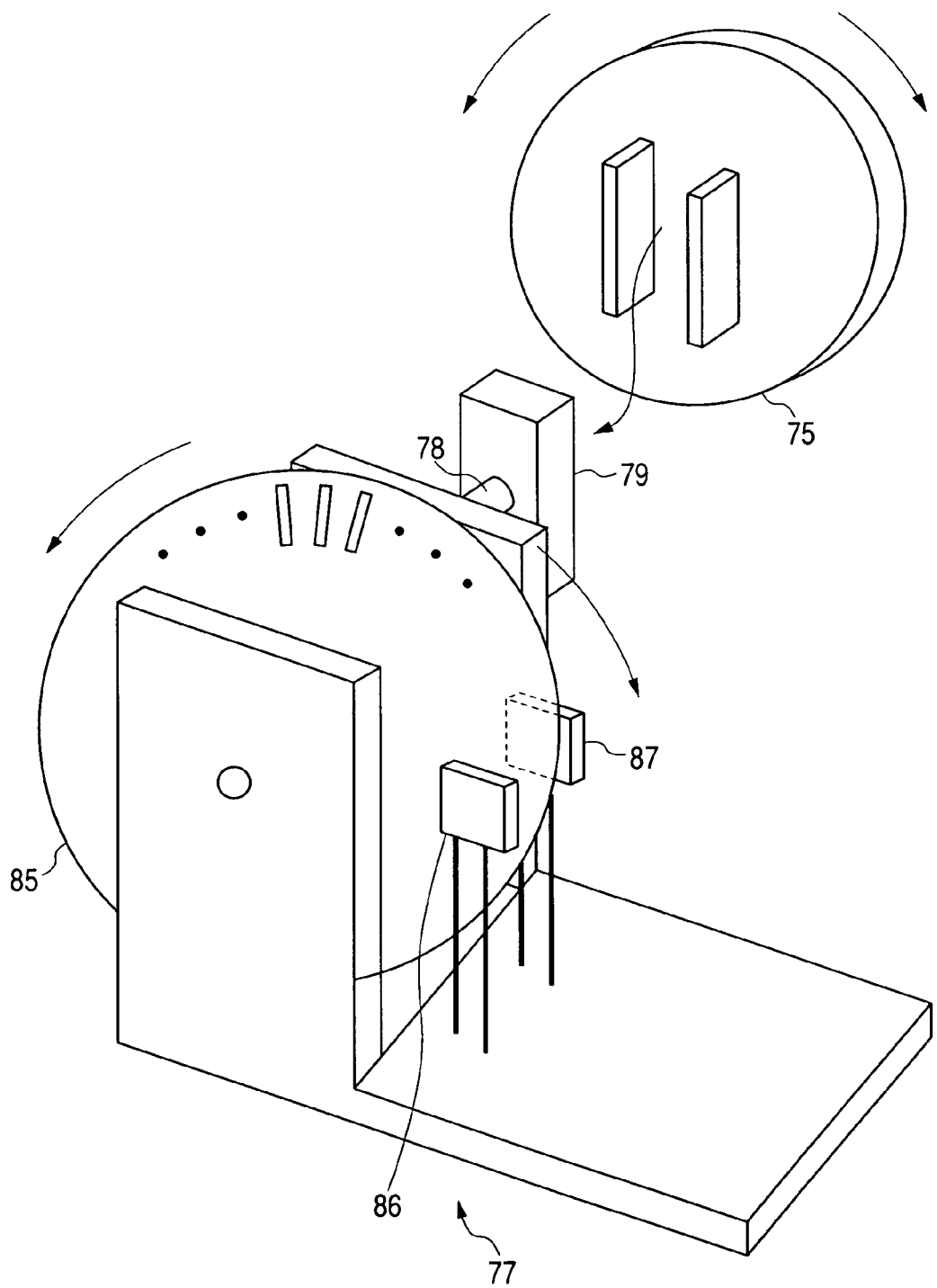
FIG. 4 is a perspective view of a rotary encoder for detecting the rotation amount of the handle in FIG. 1.

FIG. 4 is a perspective view of a rotary encoder for detecting the rotation amount of the handle 7 in FIG. 1. As shown in FIG. 4, a bonding member 79 of the rotary encoder 77 is fitted into the bonding plate 75. The bonding member 79 is attached to a rotating shaft 78 of the rotary encoder 77, and the bonding plate 75 is attached to the projection 71 of the handle 7 in FIG. 3A. Therefore, a disk 85 of the rotary encoder 77 rotates as the handle 7 rotates.

Since the disk 85 is formed with slits, when the disk 85 rotates, light emitted by a photodiode 86 is intermittently inputted into a phototransistor unit 87. Accordingly, the rotation amount of the handle 7 can be detected by counting pulse signals outputted from the phototransistor unit 87. Besides, the phototransistor unit 87 is configured of two transistors disposed above and below, thus making it possible to detect even the rotation direction of the handle 7.

Figure 5:
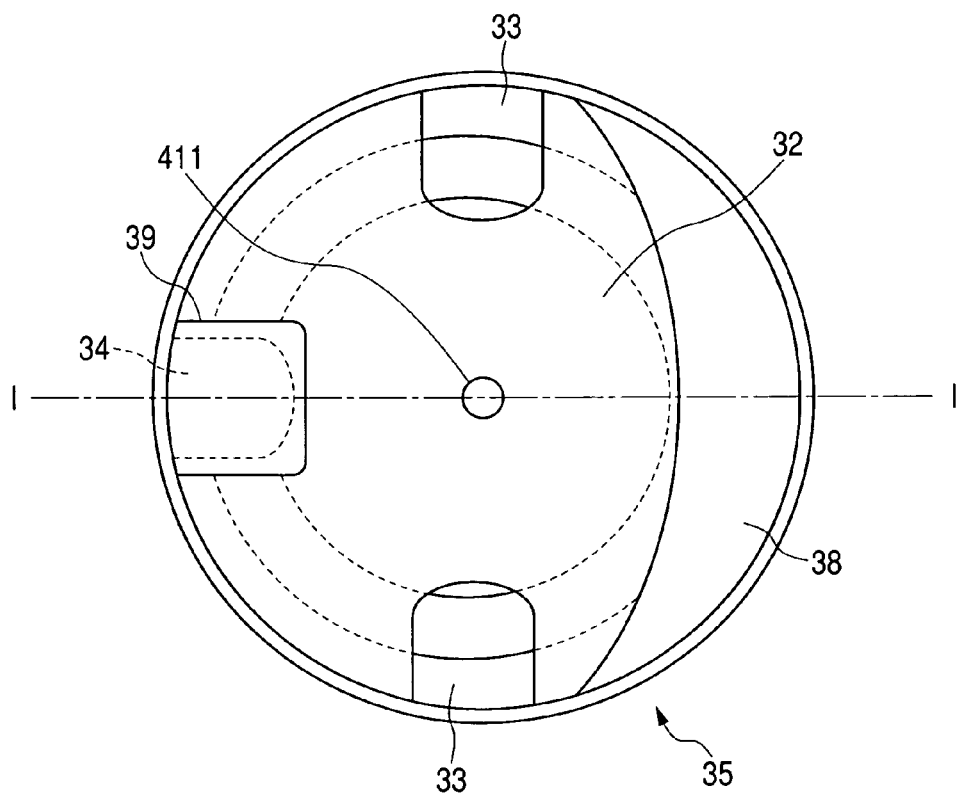
FIG. 5 is a plan view of a hopper disposed inside the housing in FIG. 1.
Figure 6:
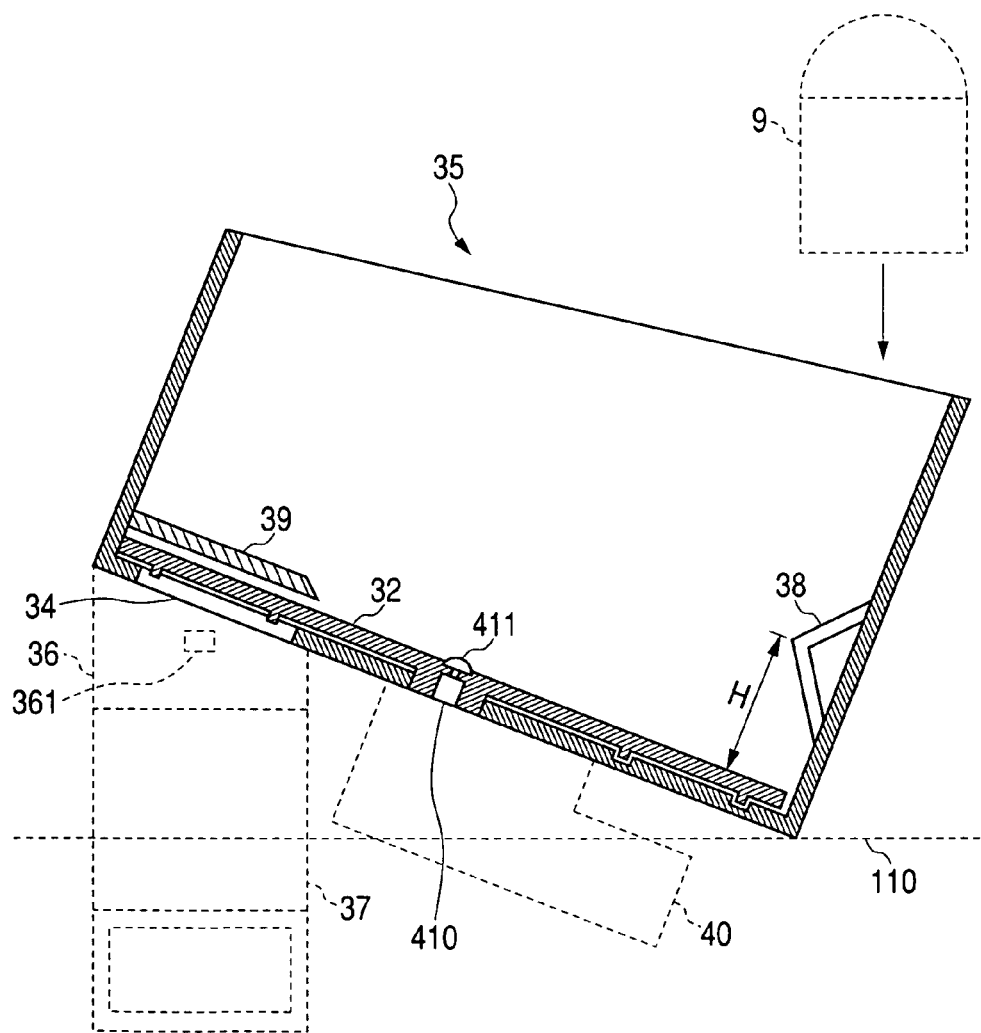
FIG. 6 is a sectional view taken along the line I-I of FIG. 5.

FIG. 5 is a plane view of a hopper disposed inside the housing 3 in FIG. 1. FIG. 6 is a sectional view taken along the line I-I of FIG. 5.

As shown in FIGS. 5 and 6, a rotating disk 32 is attached to the bottom of the hopper 35 so as to be rotatable by a motor unit 40. The rotating disk 32 is formed with two through-holes 33 for receiving the coin 8. Accordingly, the motor unit 40 rotates the rotating disk 32, whereby the coins 8 taken in the through-holes 33 can be pushed out to a coin drop opening 34 formed in a bottom portion of the hopper 35. Thereby, the coin 8, passing through guide members 36, 37 from the coin drop opening 34, is ejected outside of the coin ejection opening 13 in FIG. 1.

Here, a coin uprise prevention member 38 is attached to an inner side face of the hopper 35. This provides such a configuration that the coin 8 is prevented from rising up, thus making it easy to take the coin 8 in the through-holes 33, whereby the coin 8 can be smoothly ejected outside. Particularly, this configuration becomes effective when the amount of the coin 8 accumulated in the hopper 35 decreases. Since the coin uprise prevention member 38 has such a function, as shown in FIG. 6, a distance H from the rotating disk 32 to the peak of the coin uprise prevention member 38 is preferably set longer than the diameter of the coin 8.

Besides, the hopper 35 is disposed inside the housing 3, inclined at a predetermined angle to a horizontal plane 110. The purpose is that even when the amount of the coin 8 accumulated in the hopper 35 decreases, the coin 8 is gathered in the lowermost portion of the hopper 35, thus making it easy to taking the coin 8 in the through-holes 33. Accordingly, the coin uprise prevention member 38 is attached to and centered on the lowermost portion of the hopper 35. On the contrary, the coin drop opening 34 is formed at the uppermost position of the bottom of the hopper 35.

Furthermore, a plate 39 is disposed immediately above the coin drop opening 34 so as to sandwich the rotating disk 32 therebetween. The plate 39 is configured in a manner that the coin 8 once taken in the through-holes 33 are prevented from coming off the through-holes 33 again, thus allowing the coin 8 to reliably drop from the coin drop opening 34.

Additionally, as shown in FIG. 6, the coin 8 inserted from the coin inserting portion 9 is accumulated in the hopper 35. Besides, the illustration of the through-holes 33 of the rotating disk 32 is omitted in FIG. 6. Furthermore, although not shown, an insertion opening with a cover for inserting the coin 8 therethrough into the hopper 35 is formed in the housing 3 separately from the coin inserting portion 9.

Figure 7:
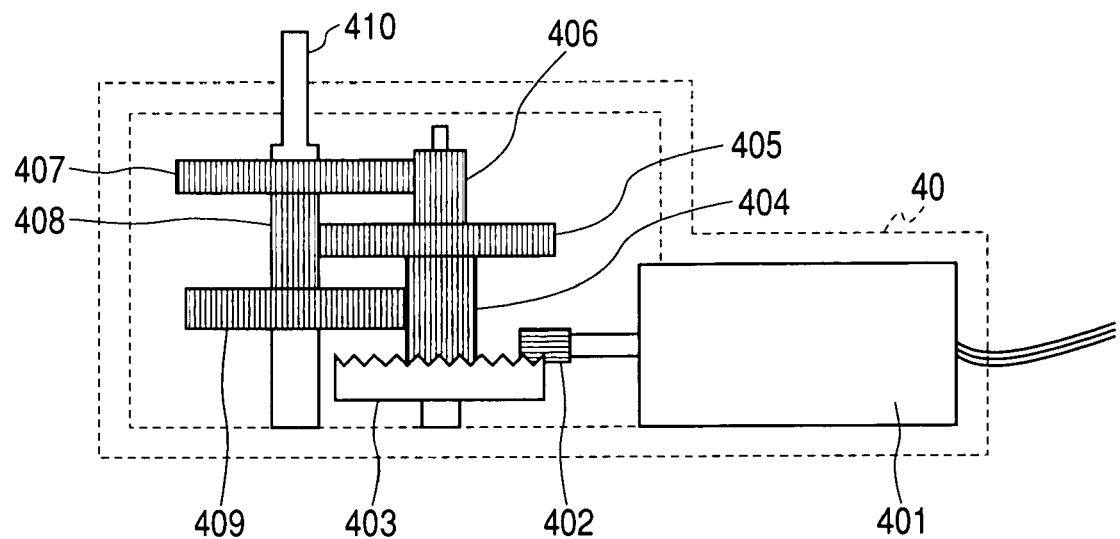
FIG. 7 is a perspective view of a motor unit in FIG. 6.

FIG. 7 is a perspective view of the motor unit 40 in FIG. 6. As shown in FIG. 7, the motor unit 40 includes a DC motor 401, gears 402 to 409, and a rotating shaft 410. The DC motor 401 is driven, thereby rotating the rotating shaft 410 via the gears 402 to 409. This rotating shaft 410 is fixed by a screw 411 to the center of the rotating disk 32 shown in FIG. 6. Accordingly, the DC motor 401 rotates the rotating shaft 410, thereby enabling the rotation of the rotating disk 32.

Here, the motor unit 40, the rotating disk 32, and the plate 39 configure a payout mechanism.

Figure 8:
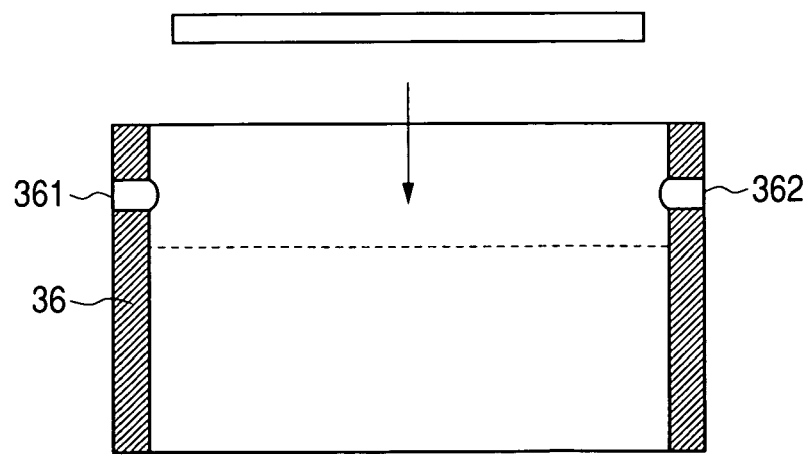
FIG. 8 is an explanatory view of a guide member in FIG. 6.

FIG. 8 is an explanatory view of the guide member 36 in FIG. 6. As shown in FIG. 8, a photodiode 361 and a phototransistor 362 are disposed in the guide member 36 connected to the coin drop opening 34 in FIG. 6, so as to sandwich therebetween a path inside the guide member 36. The method of detecting the coin 8 by the photodiode 361 and the phototransistor 362 is the same as the detection method by the photodiode 92 and the phototransistor 93, wherein the light blocking by the side face 81 of the coin 8 is detected to detect the passing of the coin 8.

Thus, the coin 8 dropped from the coin drop opening 34 is counted. Additionally, only the photodiode 361 is shown in FIG. 6, but the phototransistor 362 is disposed on the opposite side. Besides, the photodiode 361 and the phototransistor 362 are disposed in the vicinity of the coin drop opening 34 in order to improve the accuracy of detection of the coin 8.

Game contents will now be described, citing several examples. First, when the power switch 6 is turned on, a game selection screen is displayed on the screen 101 of the television monitor 100.

Figure 9:
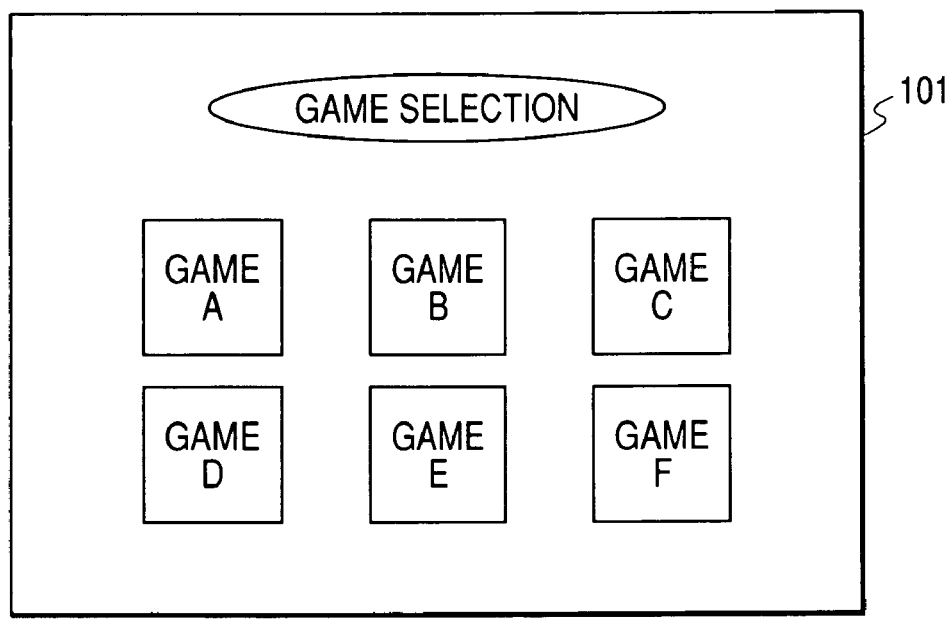
FIG. 9 is an illustration of a game selection screen according to the embodiment.

FIG. 9 is an illustration of a game selection screen according to the embodiment. As shown in FIG. 9, when the power switch 6 in FIG. 1 is turned on, the game selection screen is displayed on the screen 101 of the television monitor 100. In the example of FIG. 9, the player can select the desired game from among six kinds of games A to F.

Specifically, the display of the game A lights on at first, and when the player rotates the handle 7 clockwise, the display of the game B lights on. Then, when the player returns the handle 7 to the reference position and again rotates the handle 7 clockwise, the display of the game C lights on, and so on. The game contents can be selected one after another by thus operating the handle 7. When the handle 7 is rotated counterclockwise, the lighting direction is reversed. Further, when the player pushes the decision button 5, execution of the then selected game content, which is then lighted on, is determined. Following game programs are executed in accordance with selection thereof by the player.

Figure 10:
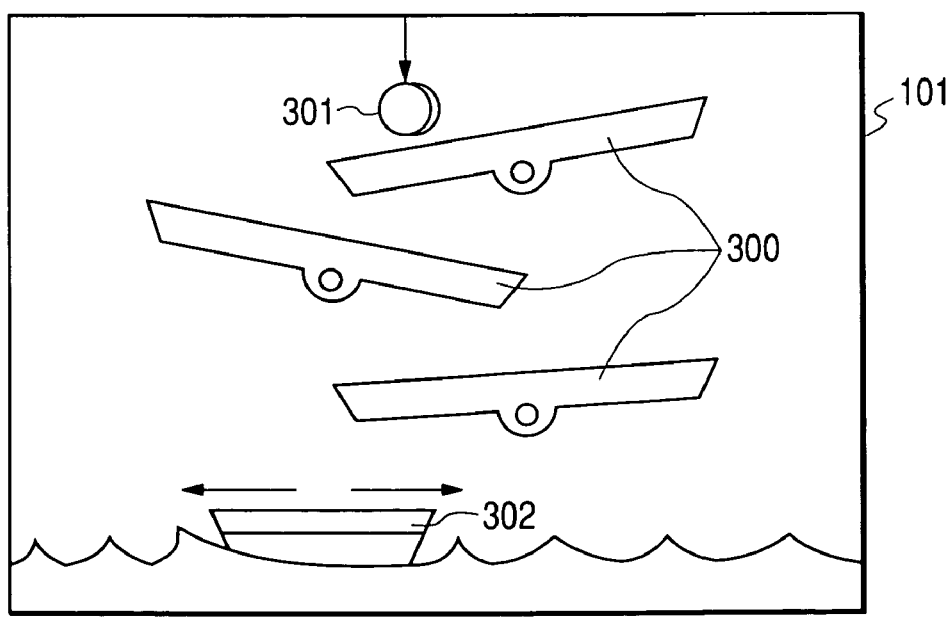
FIG. 10 is an illustration of a game screen of a game A in FIG. 9.

FIG. 10 is an illustration of a game screen of the game A in FIG. 9. As shown in FIG. 9, when the player selects the game A, a seesaw game screen is displayed on the screen 101.

When the player inserts the coin 8 from the coin inserting portion 9, a coin image 301 simulating the coin 8 appears on the screen 101 synchronized with the insertion of the coin 8. The coin image 301 moves from up to down, which is from the appearance position, and reaches seesaw images 300.

When the player rotates the handle 7 counterclockwise, the seesaw images 300 on the screen 101 rotate counterclockwise. On the contrary, when the player rotates the handle 7 clockwise, the seesaw images 300 rotate clockwise. In this case, the rotation amount of the seesaw images 300 varies according to the rotation amount of the handle 7.

Accordingly, the player operates the handle 7 to control the movements of the seesaw images 300, thereby enabling to control the movement of the coin image 301 that has reached the seesaw images 300. Further, when the player can drop the coin image 301 onto a ship image 302 which is moving from side to side while performing such control, then a predetermined number of coins are paid out from the coin ejection opening 13.

Figure 11:
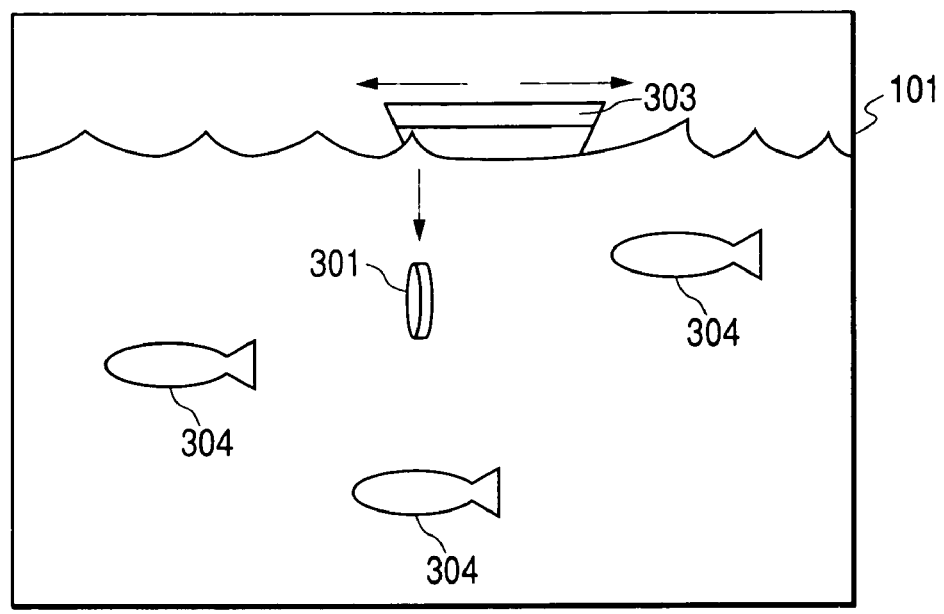
FIG. 11 is an illustration of a game screen of a game B in FIG. 9.

FIG. 11 is an illustration of a game screen of the game B in FIG. 9. As shown in FIG. 11, when the player selects the game B, a ship image 303 and fish images 304 are displayed on the screen 101.

When the player rotates the handle 7 counterclockwise, the ship image 303 on the screen 101 moves in a leftward direction. On the contrary, when the player rotates the handle 7 clockwise, the ship image 303 on the screen 101 moves in a rightward direction. In this case, the moving amount of the ship image 303 varies according to the rotation amount of the handle 7.

When the player inserts the coin 8 from the coin inserting portion 9, the coin image 301 appears below the ship image 303 synchronized with the insertion of the coin 8. The coin image 301 moves from up to down, which is from the appearance position.

When the player operates the handle 7 to move the ship image 303 and inserts the coin 8 at the time the ship image 303 comes to a proper position, the appeared coin image 301 hits against the fish images 304. Then, a predetermined number of coins are paid out from the coin ejection opening 13.

Figure 12:
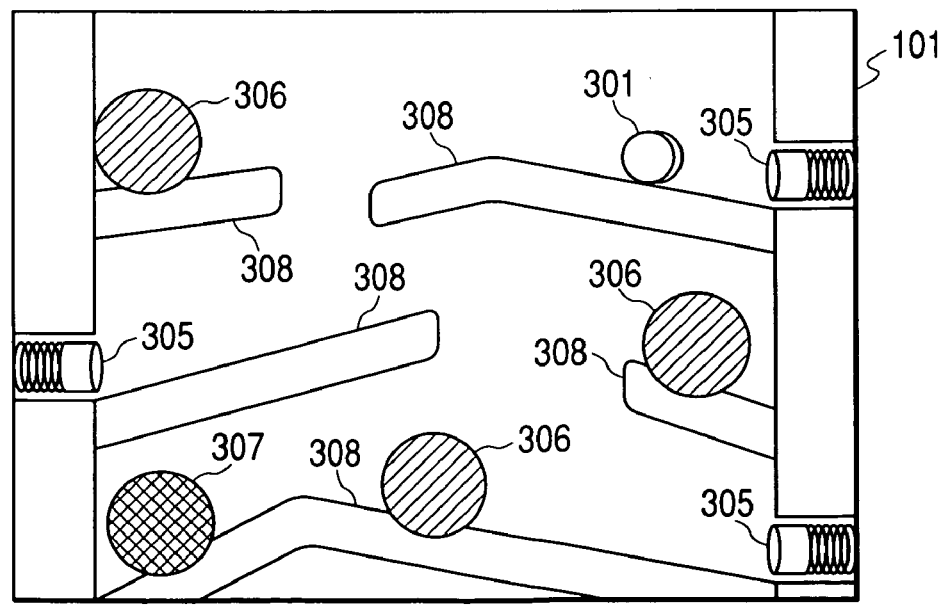
FIG. 12 is an illustration of a game screen of a game C in FIG. 9.

FIG. 12 is an illustration of a game screen of the game C in FIG. 9. As shown in FIG. 12, when the player selects the game C, hole images 306, a goal image 307, push-out body images 305, and path images 308 are displayed on the screen 101.

When the player inserts the coin 8 from the coin inserting portion 9, the coin image 301 simulating the coin 8 appears on the screen 101 synchronized with the insertion of the coin 8. The coin image 301 moves from up to down, which is from the appearance position, reaches any one of the path image 308, and then rolls along the path image 308 to the respective push-out body image 305.

When the player rotates the handle 7 clockwise, the push-out body images 305 displayed on the right side of the screen 101 perform a contraction motion, which is a contraction motion of a spring image. Continuously, when the player rotates the handle 7 counterclockwise, the push-out body images 305 perform an extension motion, which is an extension motion of the spring image. Thus, the coin image 301 is pushed out by the push-out body images 305.

On the contrary, when the player rotates the handle 7 counterclockwise, the push-out body images 305 displayed on the left side of the screen 101 perform a contraction motion, which is a contraction motion of a spring image. Continuously, when the player rotates the handle 7 clockwise, the push-out body images 305 perform an extension motion, which is an extension motion of the spring image. Thus, the coin image 301 is pushed out by the push-out body image 305.

The player operates the handle 7 as described above, and drives the push-out body images 305 to push out the coin image 301. Then, the coin image 301 moves along the respective path image 308. In this case, the coin image 301 is pushed out by the strength responsive to the rotation amount of the handle 7, so that the moving amount of the coin image 301 can be controlled by the rotation amount of the handle 7.

When the player skillfully controls the extension and contraction motion of the push-out body images 305 with the handle 7 and thus can lead the coin image 301 to the goal image 307 without dropping the coin image 301 into the hole images 306, then a predetermined number of coins are paid out from the coin ejection opening 13.

Figure 13:
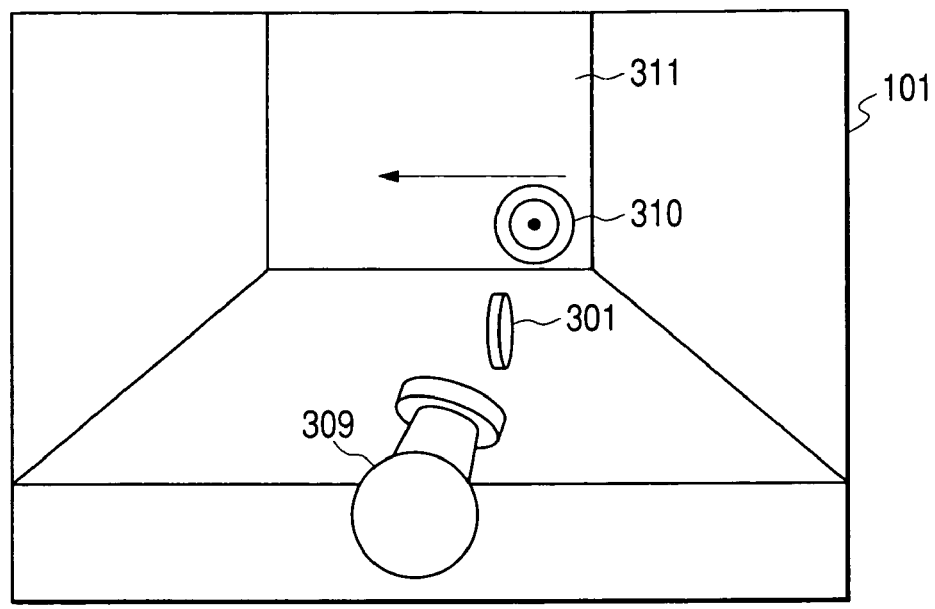
FIG. 13 is an illustration of a game screen of a game D in FIG. 9.

FIG. 13 is an illustration of a game screen of the game D in FIG. 9. As shown in FIG. 13, when the player selects the game D, a targeting game is displayed on the screen 101.

When the player rotates the handle 7 counterclockwise, a cannon image 309 on the screen 101 turns to the left. On the contrary, when the player rotates the handle 7 clockwise, the cannon image 309 turns to the right. In this case, the moving amount of the cannon image 309 varies according to the rotation amount of the handle 7.

When the player inserts the coin 8 from the coin inserting portion 9, the coin image 301 appears from the cannon image 309 synchronized with the insertion of the coin 8. The coin image 301 moves from the cannon image 309, which is from the appearance position, to a wall image 311 of the back. In this case, the coin image 301 moves in a direction responsive to the direction of the cannon image 309.

When the player operates the handle 7 to skillfully control the direction of the cannon image 309 and can thereby hit the coin image 301 to a moving target image 310, then a predetermined number of coins are paid out from the coin ejection opening 13.

Figure 14:
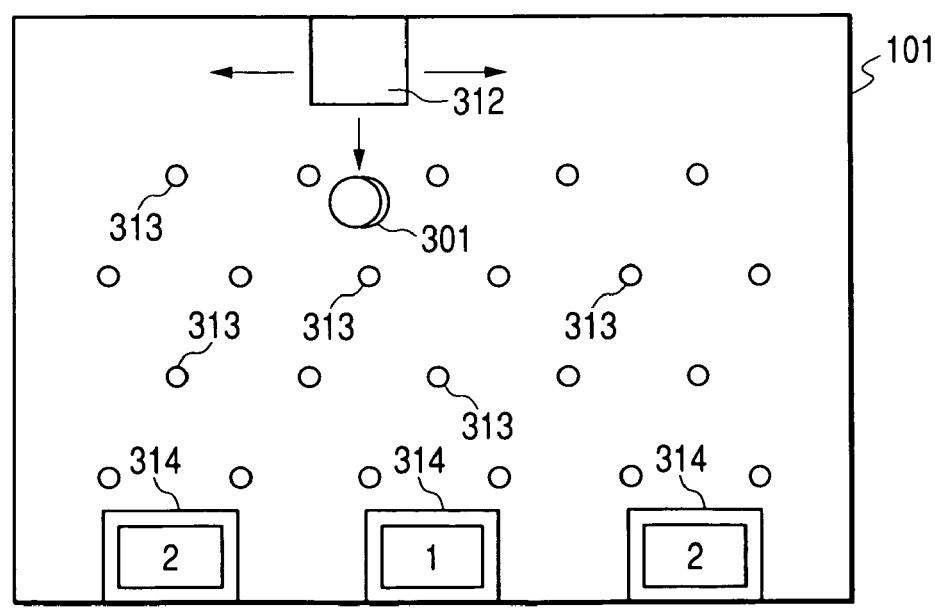
FIG. 14 is an illustration of a game screen of a game E in FIG. 9.

FIG. 14 is an illustration of a game screen of the game E in FIG. 9; As shown in FIG. 14, when the player selects the game E, a Corinth game screen is displayed on the screen 101.

A coin inserting body image 312 is displayed in an upper portion of the screen 101. The coin inserting body image 312 moves from side to side. Besides, nail images 313 and score box images 314 are displayed on the screen 101.

When the player inserts the coin 8 from the coin inserting portion 9, the coin image 301 appears from the coin inserting body image 312 synchronized with the insertion of the coin 8. The coin image 301 moves from up to down, which is from the appearance position. In this case, the coin image 301 drops down hitting the nail images 313.

When the player inserts the coin 8 at the time the coin inserting body image 312 comes to a proper position, the then appeared coin image 301 reaches any one of the score box image 314 even while hitting the nail images 313. Then, a number of coins 8 equivalent to the numbers displayed on the score box images 314 are paid out from the coin ejection opening 13.

Figure 15:
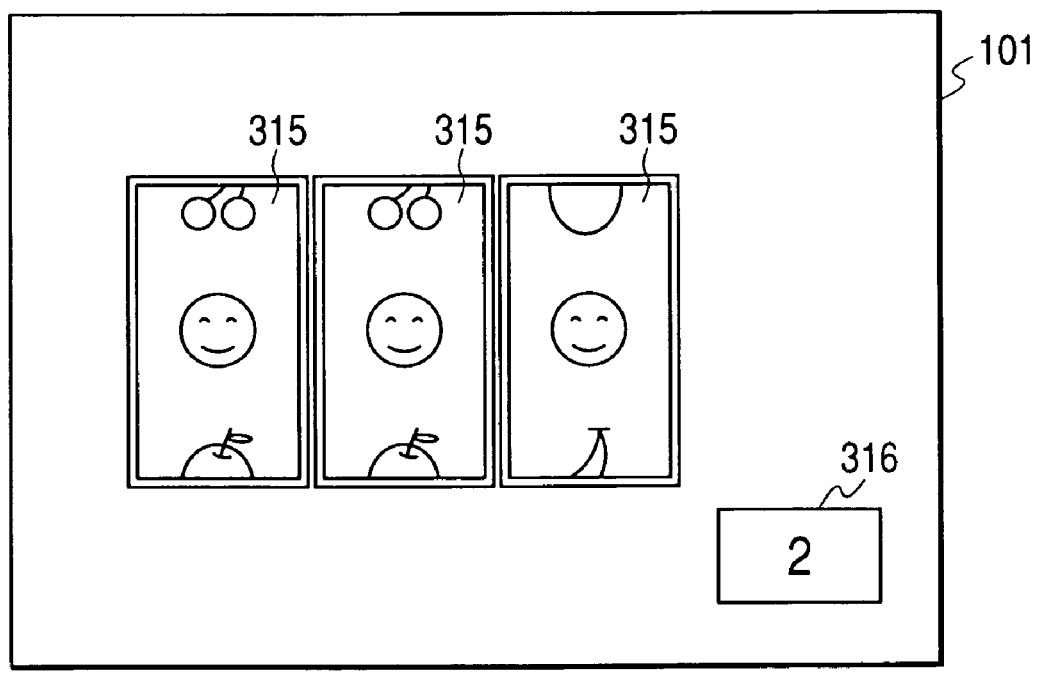
FIG. 15 is an illustration of a game screen of a game F in FIG. 9.

FIG. 15 is an illustration of a game screen of the game F. As shown in FIG. 15, when the player selects the game F, a slot machine game screen is displayed on the screen 101.

This screen includes a coin number display portion 316 for displaying the number of coins 8 inserted. Besides, three drum images 315 are displayed on the screen.

When the player inserts the coin 8 and pushes the decision button 5, the drum images 315 rotate. When the player operates the handle 7 to select any one of the drum images 315 and pushes the decision button 5, the selected drum image 315 stops. When the three drum images 315 are thus stopped and show the same patterns, then a number of coins 8 equivalent to the number of coins 8 inserted are paid out from the coin ejection opening 13.

Figure 16:
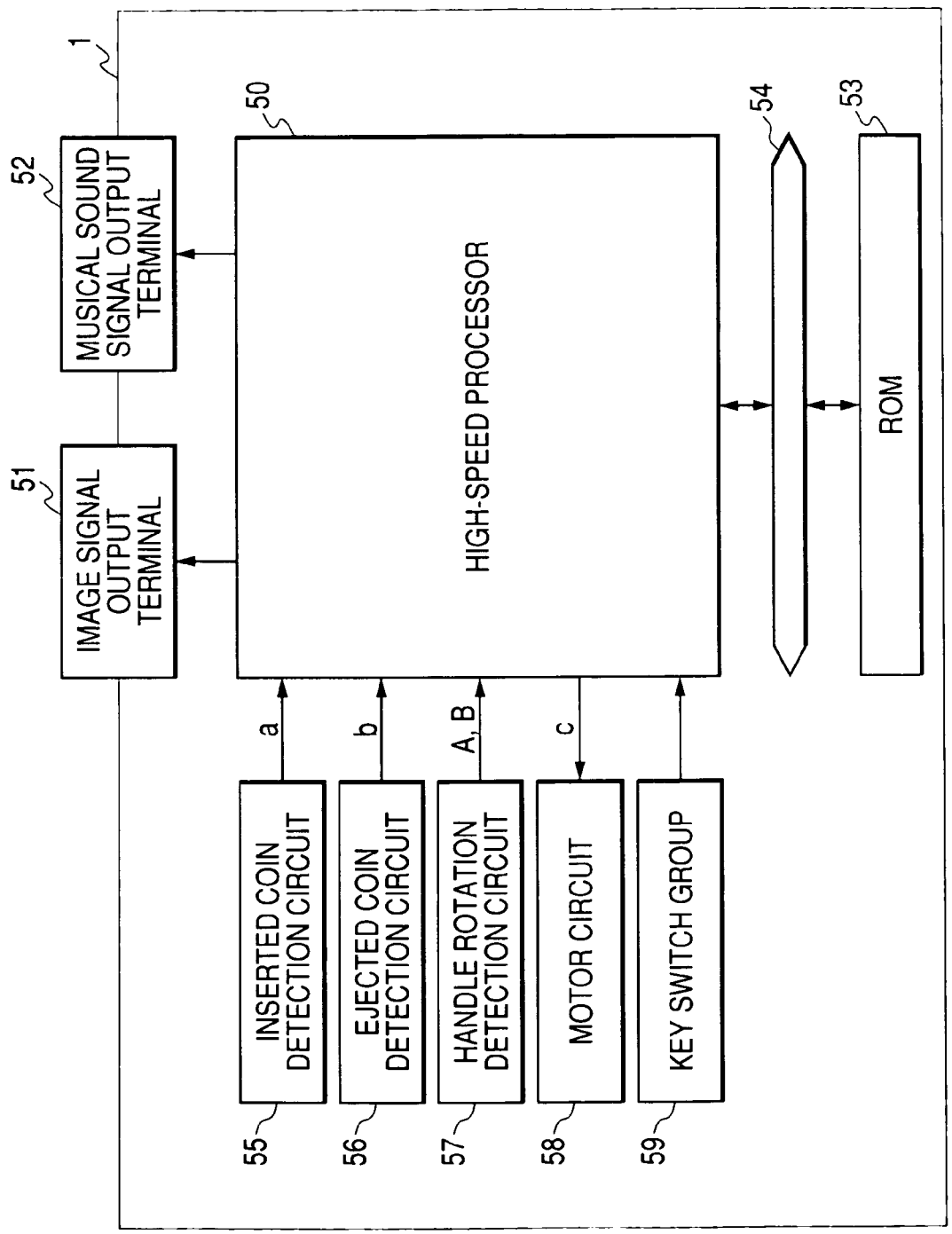
FIG. 16 is a diagram showing an electrical configuration of the game apparatus in FIG. 1.

FIG. 16 is a diagram showing an electrical configuration of the game apparatus 1 in FIG. 1. As shown in FIG. 16, the game apparatus 1 includes a high-speed processor 50, an image signal output terminal 51, a musical sound signal output terminal 52, a ROM (read only memory) 53, a bus 54, an inserted coin detection circuit 55, a ejected coin detection circuit 56, a handle rotation detection circuit 57, a motor circuit 58, and a key switch group 59.

The inserted coin detection circuit 55 includes the photodiode 92 and the phototransistor 93 of the coin inserting portion 9 in FIG. 2. The inserted coin detection circuit 55 supplies a signal a from the phototransistor 93 to the high-speed processor 50. The high-speed processor 50 detects the transition from an H (High) level to an L (Low) level of the signal a from the inserted coin detection circuit 55, thus detecting that the coin 8 is inserted. Besides, the high-speed processor 50 counts the number of transitions from the H level to the L level. This count value provides the number of coins 8 inserted.

The ejected coin detection circuit 56 includes the photodiode 361 and the phototransistor 362 of the guide member 36 in FIG. 8. The ejected coin detection circuit 56 supplies a signal b from the phototransistor 362 to the high-speed processor 50. The high-speed processor 50 detects the transition from an H level to an L level of the signal b from the ejected coin detection circuit 56, thus detecting that the coin 8 is ejected. Besides, the high-speed processor 50 counts the number of transitions from the H level to the L level. This count value provides the number of coins 8 ejected.

The handle rotation detection circuit 57 includes the photodiode 86 and the phototransistor unit 87 of the rotary encoder 77 in FIG. 4. The handle rotation detection circuit 57 supplies two pulse signals A, B outputted from two phototransistors of the phototransistor unit 87 to the high-speed processor 50. The high-speed processor 50 counts the number of state transitions of the two pulse signals A, B, thus detecting the amount of rotation of the handle 7. Besides, since the phase difference between the two pulse signals A, B varies according to the rotation direction of the handle 7, the high-speed processor 50 detects the phase difference, thereby detecting the rotation direction of the handle 7.

The motor circuit 58 includes the DC motor 401 in FIG. 7. The high-speed processor 50 supplies a control signal c to the motor circuit 58, thereby controlling the driving of the DC motor 401. That is, the high-speed processor 50 supplies the control signal c to the motor circuit 58, thereby controlling the rotation of the rotating disk 32 disposed in the hopper 35.

The key switch group 59 includes the decision button 5 and the cancel button 11 of FIG. 1. The high-speed processor 50 receives on/off signals from the individual buttons 5, 11 of the key switch group 59, and executes the processing designated by the respective buttons 5, 11.

The high-speed processor 50 can access the ROM 53 via the bus 54, and executes game programs stored in the ROM 53. The high-speed processor 50 reads image data and musical sound data stored in the ROM 53, and performs necessary processing, thus creating the image signal and the musical sound signal. The image signal and the musical sound signal thus created are respectively supplied to the image signal output terminal 51 and the musical sound output terminal 52, and are outputted to the television monitor 100 via the AV cable 102.

Figure 17:
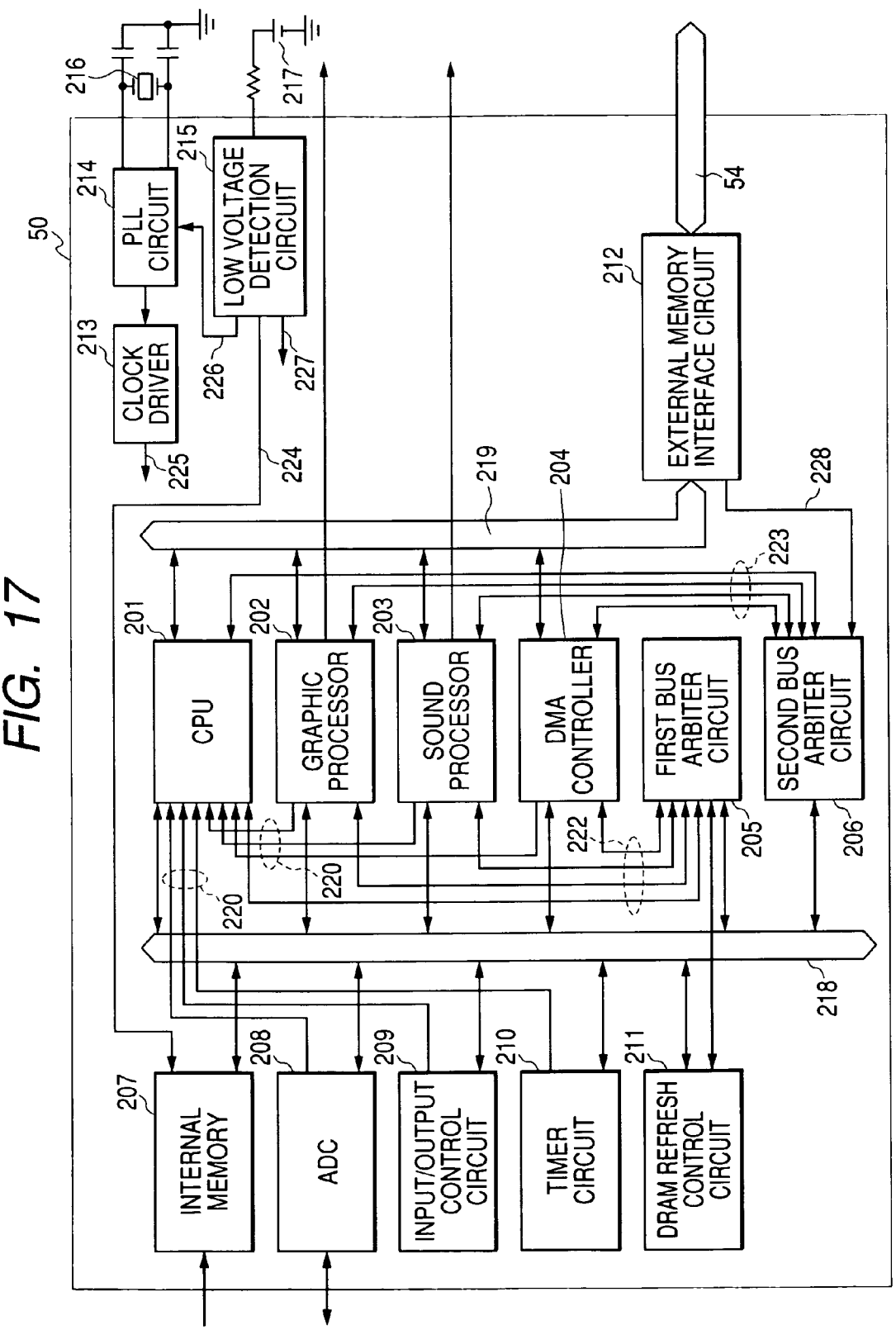
FIG. 17 is a block diagram showing a detail of a high-speed processor in FIG. 16.

FIG. 17 is a block diagram showing a detail of the high-speed processor in FIG. 16. As shown in FIG. 17, the high-speed processor 50 includes a CPU (central processing unit) 201, a graphic processor 202, a sound processor 203, a DMA (direct memory access) controller 204, a first bus arbiter circuit 205, a second bus arbiter circuit 206, an internal memory 207, an A/D converter (ADC: analog to digital converter) 208, an input/output control circuit 209, a timer circuit 210, a DRAM (dynamic random access memory) refresh control circuit 211, an external memory interface circuit 212, a clock driver 213, a PLL (phase-locked loop) circuit 213, a low voltage detection circuit 215, a first bus 218, and a second bus 219.

The CPU 201 performs various calculations and controls the entire system according to programs stored in the internal memory 207 or the ROM 53. The CPU 201 is a bus master for the first bus 218 and the second bus 219, and can access resources connected to the respective buses.

The graphic processor 202 is a bus master for the first bus 218 and the second bus 219, generates an image signal based on the data stored in the internal memory 207 or the ROM 53, and outputs the image signal to the image signal output terminal 51. The graphic processor 202 is controlled by the CPU 201 through the first bus 218. Besides, the graphic processor 202 has a function of generating an interruption request signal 220 to the CPU 201.

The sound processor 203 is a bus master for the first buss 218 and the second bus 219, generates a musical sound signal based on the internal memory 207 or the ROM 53, and outputs the musical sound signal to the musical sound output terminal 52. The sound processor 203 is controlled by the CPU 201 through the first bus 218. Besides, the sound processor 203 has a function of generating an interruption request signal 220 to the CPU 201.

The DMA controller 204 manages the data transfer from the ROM 53 to the internal memory 207. Besides, the DMA controller 204 has a function of generating an interruption request signal 220 to the CPU 201 in order to give notice of completion of the data transfer. The DMA controller 204 is a bus master for the first bus 218 and the second bus 219. The DMA controller 204 is controlled by the CPU 201 through the first bus 218.

The internal memory 207 provides any necessary one of a mask ROM, an SRAM (static random access memory), and a DRAM When the data hold of the SRAM by a battery is necessary, a battery 217 is needed accordingly. When the DRAM is mounted thereon, an operation for holding memory contents, which is called a refresh operation, is needed at periodic intervals.

The first bus arbiter circuit 205 accepts first bus use request signals from the respective bus masters of the first bus 218, performs bus arbitration among the requests for the first bus 218, and issue a first bus use permission signal to one of the respective bus masters. Each bus master is permitted to access the first bus 218 after receiving the first bus use permission signal. In FIG. 17, the first bus use request signal and the first bus use permission signal are illustrated as first bus arbitration signals 222.

The second bus arbiter circuit 206 accepts second bus use request signals from the respective bus masters of the second bus 219, performs bus arbitration among the requests for the second bus 219, and issue a second bus use permission signal to one of the respective bus masters. Each bus master is permitted to access the second bus 219 after receiving the second bus use permission signal. In FIG. 17, the second bus use request signal and the second bus use permission signal are illustrated as second bus arbitration signals 223.

The input/output control circuit 209 serves to perform input and output operations of input/output signals to enable the communication with external input/output device(s) and/or external semiconductor device(s). The read and write operations of input/output signals are performed by the CPU 201 through the first bus 218. Also, the input/output control circuit 209 has the functionality of outputting an interruption request signal 220 to the CPU 201.

Here, the input/output control circuit 209 receives the signal a from the inserted coin detection circuit 55, the signal b from the ejected coin detection circuit 56, the signals A, B from the handle rotation detection circuit 57, and the signals from the key switch group 59. Besides, the input/output control circuit 209 outputs the control signal c of the DC motor 401 to the motor circuit 58.

The timer circuit 210 has a function of generating an interruption request signal 220 to the CPU 201 based on a designated time interval. The designation of the time interval is performed by the CPU 201 via the first bus 218.

The ADC 208 converts an analog input signal to a digital signal. The CPU 201 reads the digital signal via the first bus 218. Besides, the ADC 208 has a function of generating an interruption request signal 220 to the CPU 201.

The PLL circuit 214 generates a high-frequency clock signal multiplied by a sinusoidal signal obtained from a crystal oscillator 216.

The clock driver 213 amplifies the high-frequency clock signal received from the PLL circuit 214 to a signal strength level strong enough to supply a clock signal 225 to each block.

The low voltage detection circuit 215 monitors a power voltage VCC and, when the power voltage VCC is equal to or lower than a predetermined voltage, issues a reset signal 226 for the PLL circuit 214 and a reset signal 227 for the entire system exclusive thereof. Besides, when the internal memory 207 comprises the SRAM and thus requires the data hold of the SRAM by the battery 217, the low voltage detection circuit 215 has a function of issuing a battery back-up control signal 224 in the condition that the power voltage VCC is equal to or lower than the predetermined voltage.

The external memory interface circuit 212 has a function of connecting the second bus 219 to the external bus 54, and a function of controlling the bus cycle length of the second bus by transmitting a cycle terminating signal 228 for the second bus 219.

The DRAM refresh control circuit 211 unconditionally acquires the right to use the first bus 218 in each fixed interval, thus performing the refresh operation of the DRAM. The DRAM refresh control circuit 211 is disposed when the internal memory 207 includes the DRAM.

Figure 18:
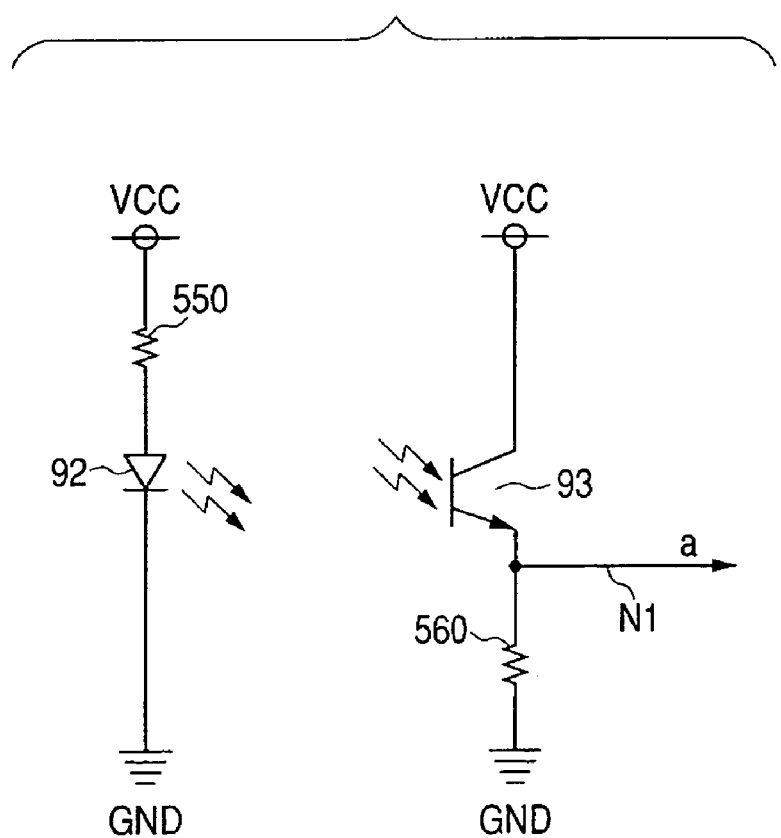
FIG. 18 is a circuit diagram of an inserted coin detection circuit in FIG. 16.

FIG. 18 is a circuit diagram of the inserted coin detection circuit 55 in FIG. 16. As shown in FIG. 18, the inserted coin detection circuit 55 includes the photodiode 92, the phototransistor 93, and resistor elements 550, 560.

The cathode of the photodiode 92 is connected to the ground GND, and the anode thereof is connected to one end of the resistor element 550. The other end of the resistor element 550 is connected to a power source VCC. On the contrary, the collector of the phototransistor 93 is connected to the power source VCC. One end of the resistor element 560 is connected to the ground GND. The emitter of the phototransistor 93 and the other end of the resistor element 560 are connected to a node N1. The node N1 is connected to the input/output control circuit 209.

Light emitted from the photodiode 92 is detected by the phototransistor 93, and the signal a of the H level is outputted from the node N1. When the coin 8 blocks the light, the signal a changes from the H level to the L level. Therefore, the CPU 201 detects such transition, thus detecting that the coin 8 is inserted.

Additionally, since the circuit diagram of the ejected coin detection circuit 56 in FIG. 16 is similar to the circuit diagram of the inserted coin detection circuit 55 shown in FIG. 18, the description thereof is omitted.

Figure 19:
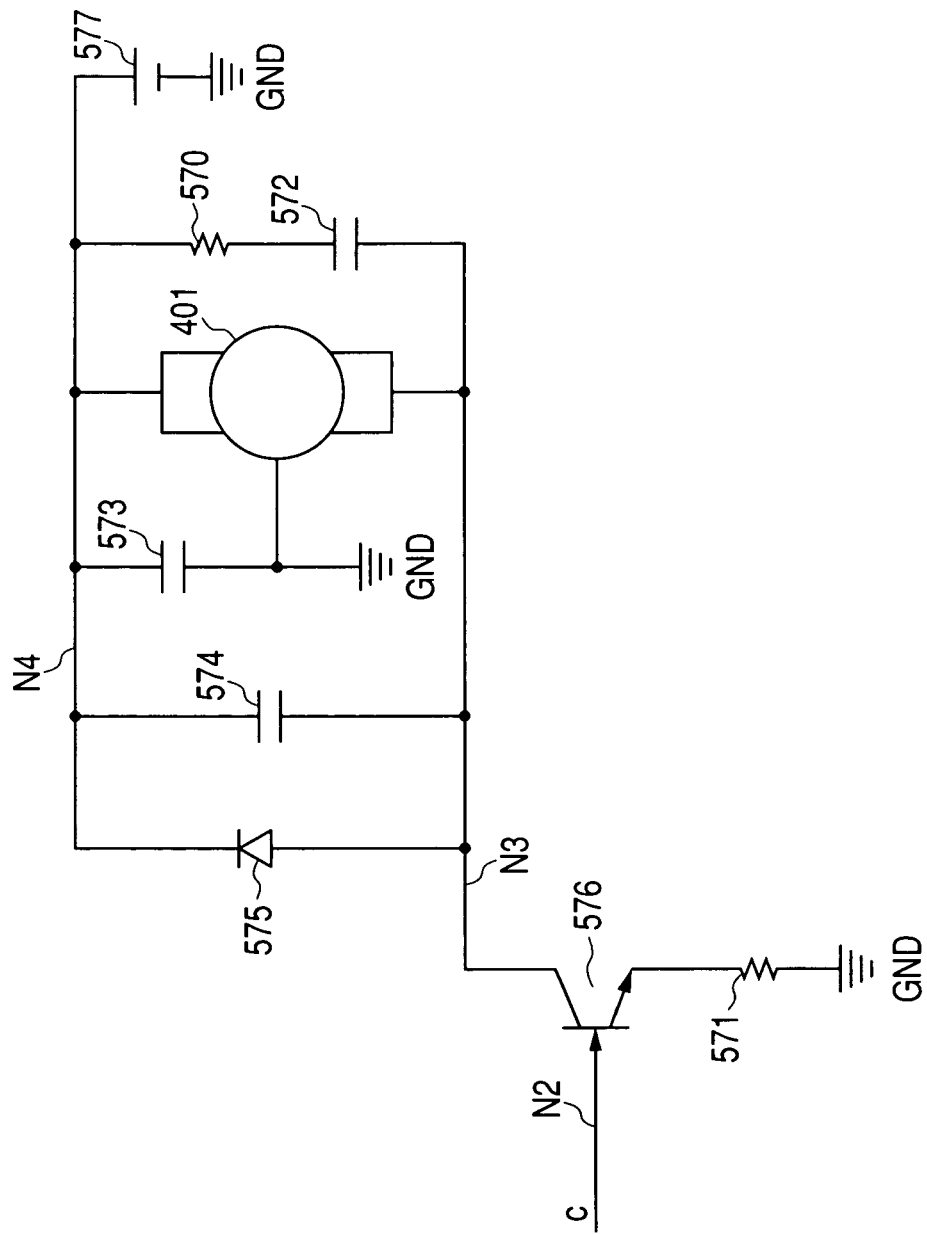
FIG. 19 is a circuit diagram of a motor circuit in FIG. 16.

FIG. 19 is a circuit diagram of the motor circuit 58 in FIG. 16. As shown in FIG. 19, the motor circuit 58 includes the DC motor 401, resistor elements 570, 571, capacitors 572 to 574, a diode 575, and a transistor 576.

The collector of the transistor 576 is connected to a node N3, the base thereof is connected to a node N2, and the emitter thereof is connected to the ground GND via the resistor element 571. The anode of the diode 575, one end of the capacitor 574, and the minus terminal of the DC motor 401 are connected to the node N3. The plus terminal of a battery 577, the cathode of the diode 575, the other end of the capacitor 574, and the plus terminal of the DC motor 401 are connected to the node N4. The resistor element 570 and the capacitor 572 are connected in series between the node N4 and the node N3. A casing of the DC motor 401 is connected to the ground GND.

The node N2 connected to the base of the transistor 576 is connected to the input/output control circuit 209. Accordingly, when the CPU 201 supplies the control signal c of the H level to the node N2 via the input/output control circuit 209, the transistor 576 is turned on to supply a ground voltage to the node N3. Thereby, the DC motor is driven.

Figure 20:
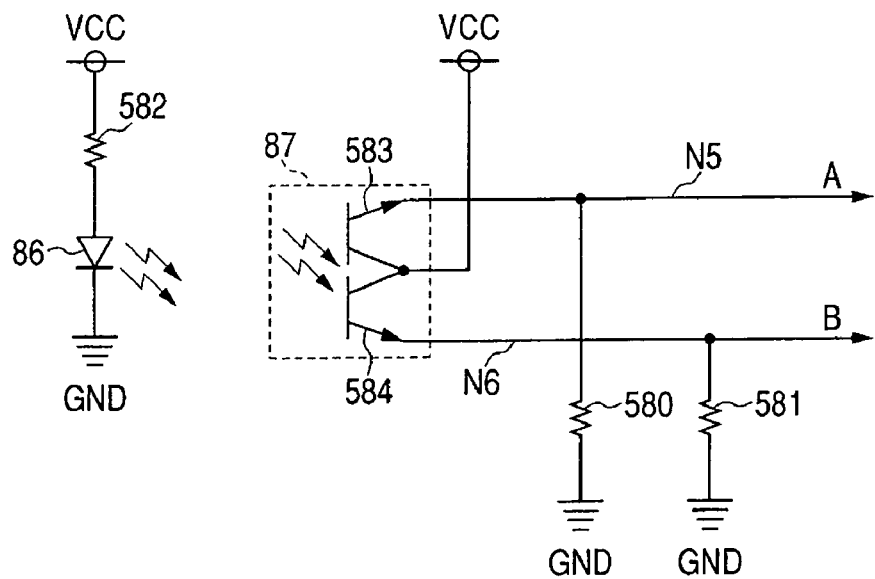
FIG. 20 is a circuit diagram of a handle rotation detection circuit in FIG. 16.

FIG. 20 is a circuit diagram of the handle rotation detection circuit 57 in FIG. 16. As shown in FIG. 20, the handle rotation detection circuit 57 includes the photodiode 86, the phototransistor unit 87, and resistor elements 580 to 582. The phototransistor unit 87 includes phototransistors 583, 584.

The cathode of the photodiode 86 is connected to the ground GND, and the anode thereof is connected to one end of the resistor element 582. The other end of the resistor element 582 is connected to the power source VCC. On the contrary, the collectors of the phototransistors 583, 584 are connected to the power source VCC. The emitter of the phototransistor 583 is connected to anode N5, and the emitter of the phototransistor 584 is connected to a node N6. The resistor element 580 is connected between the node N5 and the ground GND. The resistor element 581 is connected between the node N6 and the ground GND. The nodes N5, N6 are connected to the input/output control circuit 209.

When the phototransistor 583 receives intermittent light along with the rotation of the disk 85 of the rotary encoder 77, the pulse signal A is outputted from the node N5. Similarly, when the phototransistor 584 receives intermittent light along with the rotation of the disk 85 of the rotary encoder 77, the pulse signal B is outputted from the node N6. In this case, the phototransistor 583 and the phototransistor 584 are disposed with a predetermined distance therebetween, so that the phase is shifted between the pulse signal A and the pulse signal B.

A detailed description will now be given of detection of the rotation amount of the handle 7, that is, the rotation amount of the disk 85 of the rotary encoder 77.

Figure 21A:
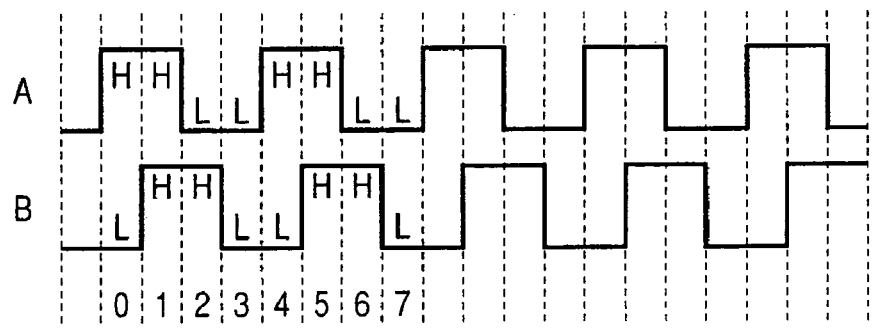
FIG. 21A is a diagram showing pulse signals outputted by two phototransistors when the handle in FIG. 1 is rotated clockwise.
Figure 21B:
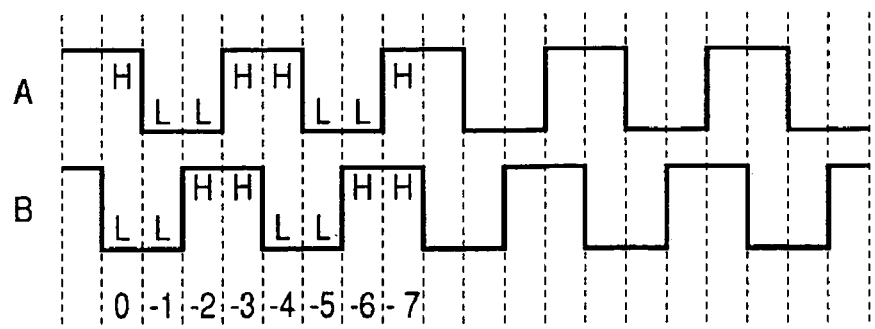
FIG. 21B is a diagram showing pulse signals outputted by the two phototransistors when the handle in FIG. 1 is rotated counterclockwise.

FIG. 21A is a diagram showing pulse signals outputted by the phototransistors 583, 584 when the handle 7 in FIG. 1 is rotated clockwise. FIG. 21B is a diagram showing pulse signals outputted by the phototransistors 583, 584 when the handle 7 in FIG. 1 is rotated counterclockwise. Additionally, for convenience of description, FIGS. 21A and 21B show pulse signals obtained when the handle 7 is rotated at a predetermined angular speed.

As shown in FIGS. 21A and 21B, the phase difference between the pulse signal A outputted by the phototransistor 583 and the pulse signal B outputted by the phototransistor 584 is 90° in FIG. 21A and −90° in FIG. 21B in accordance with the distance between the phototransistor 583 and the phototransistor 584. Thus, the state transition of the pulse signals A, B varies in direction between when the handle 7 is rotated clockwise and when it is rotated counterclockwise. This point will be described in detail.

Figure 22:
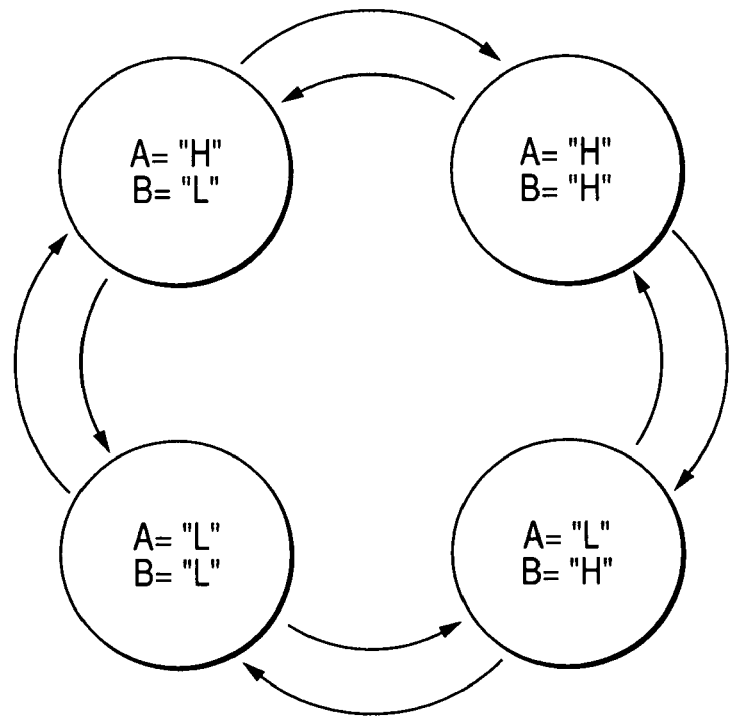
FIG. 22 is a diagram showing state transitions of pulse signals A and B outputted by the two phototransistors.

FIG. 22 is a diagram showing state transitions of the pulse signals A, B outputted by the phototransistors 583, 584. When the handle 7 is rotated clockwise, which corresponds to FIG. 21A, as shown in FIG. 22, the state of the pulse signals A, B transits clockwise. On the contrary, when the handle 7 is rotated counterclockwise, which corresponds to FIG. 21B, as shown in FIG. 22, the state of the pulse signals A, B transits counterclockwise.

The rotation direction of the handle 7 can be obtained by detecting such state transitions. That is, when the state of the pulse signals A, B transits clockwise, it means that the handle 7 is rotated clockwise. On the contrary, when the state of the pulse signals A, B transits counterclockwise, it means that the handle 7 is rotated counterclockwise. A counter included in the input/output control circuit 209 in FIG. 17 is utilized for detection of such state transitions.

Figure 23:
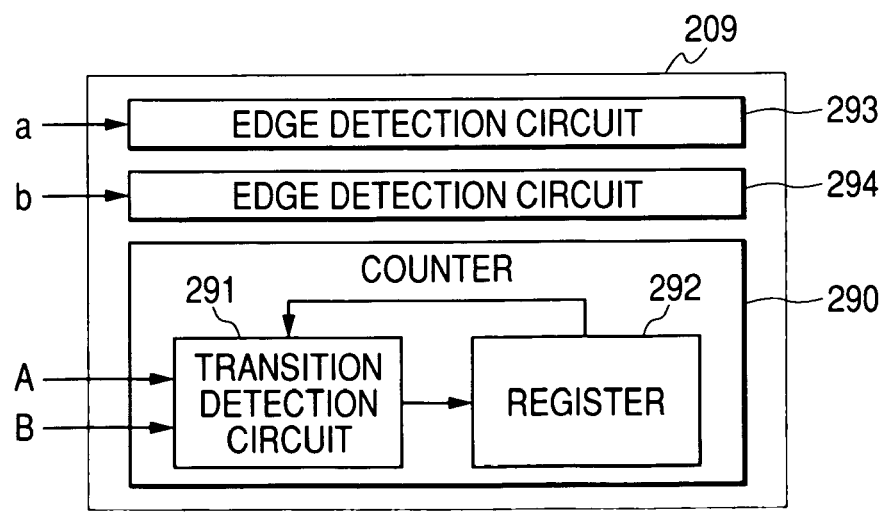
FIG. 23 is a block diagram of an input/output control circuit in FIG. 17.

FIG. 23 is a block diagram of the input/output control circuit 209 in FIG. 17. As shown in FIG. 23, the input/output control circuit 209 includes a counter 290 and edge detection circuits 293, 294. The counter 290 includes a transition detection circuit 291 and a register 292.

The transition detection circuit 291 detects the state transition of the pulse signals A, B inputted from the phototransistors 583, 584 of the rotary encoder 77, and counts the number of the transitions. Then, the transition detection circuit 291 stores the count value into the register 292.

More specifically, the transition detection circuit 291 acquires the value in the register 292, increments or decrements the value according to the direction of the state transition, and then stores the result into the register 292.

Here, when detecting the clockwise state transition shown in FIG. 22, which corresponds to FIG. 21A, the transition detection circuit 291 executes the increment. On the contrary, when detecting the counterclockwise state transition shown in FIG. 22, which corresponds to FIG. 21B, the transition detection circuit 291 executes the decrement.

In the example of FIG. 21A, the direction of the state transition of the pulse signals A, B is clockwise. Therefore, the transition detection circuit 291 counts up as 1, 2, . . . every time detecting the state transition, and stores the count value into the register 292. In the example of FIG. 21B, the direction of the state transition of the pulse signals A, B is counterclockwise. Therefore, the transition detection circuit 291 counts down as −1, −2, . . . every time detecting the state transition, and stores the count value into the register 292.

Accordingly, the CPU 201 identifies the direction of the state transition by observing the symbol of the count value stored in the register 292 and can thereby distinguish the rotation direction of the handle 7. Furthermore, the count value of the register 292 represents the rotation amount of the handle 7. When the absolute value of the count value is large, the rotation amount is large, and when the absolute value thereof is small, the rotation amount is small.

The CPU 201 acquires the information about the rotation direction and rotation amount of the handle 7 by referring to the register 292.

Here, when a count value C stored in the register 292 is "0", the handle 7 is determined to be stationary. Besides, when the count value C is −C1<C<C1, it may be configured that the handle 7 is determined to be stationary. "C1" is a natural number.

The edge detection circuit 293 detects down edges of the signal a from the inserted coin detection circuit 55. When detecting the down edges, the edge detection circuit 293 outputs inserted coin detection signals to the CPU 201. The CPU 201 counts these inserted coin detection signals and thus acquires the information about the number of coins 8 inserted. Additionally, the occurrence of a down edge in the signal a from the inserted coin detection circuit 55 means the occurrence of light blocking by the coin 8, which is the passing of the coin 8.

Similarly, the edge detection circuit 294 detects down edges of the signal b from the coin ejecting detection circuit 56. When detecting the down edges, the edge detection circuit 294 outputs ejected coin detection signals to the CPU 201. The CPU 201 counts these ejected coin detection signals and thus acquires the information about the number of coins 8 inserted. Additionally, the occurrence of a down edge in the signal b from the coin ejecting detection circuit 56 means the occurrence of light blocking by the coin 8, which is the passing of the coin 8.

A description of main processing executed by the CPU 201 in FIG. 17 will now be given.

[Coin Appearing Process] Upon receipt of a inserted coin detection signal from the input/output control circuit 209, that is, upon insertion of a coin into the coin inserting portion 9, the CPU 201 stores into the internal memory 207: coordinate data indicative of the appearance position of a coin image; and storage position data of the coin image data. Then, the CPU 201 supplies those data to the graphic processor 202 in a vertical blanking period.

The graphic processor 202 reads the coin image data from the ROM 53 based on the storage position data supplied, generates an image signal based on the coin image data and the coordinate data supplied, and then outputs the image signal to the image signal output terminal 51. Thereby, the coin image is displayed on the screen 101 of the television monitor 100. That is, the coin image appears on the screen 101 synchronized with the insertion of the coin 8.

[Operating Object Moving Process] The CPU 201 acquires the information about the rotation direction and rotation amount of the handle 7 from the input/output control circuit 209. The CPU 201 stores into the internal memory 207: the coordinate data of an operating object that is displaced in response to the those information; and the storage position data of the image data of the operating object that is displaced in response to the those information. Then, the CPU 201 supplies those data to the graphic processor 202 in a vertical blanking period.

The graphic processor 202 reads the image data of the operating object moved, based on the storage position data supplied, generates an image signal based on the image data read and the coordinate data supplied, and then outputs the image signal to the image signal output terminal 51. Thereby, the operating object moved is displayed on the screen 101 of the television monitor 100. That is, the operating object displayed on the screen 101 is moved synchronized with the movement of the handle 7.

Here, the operating object refers to an object that is moved synchronized with the rotation of the handle 7. The operating objects given as examples are the seesaw images 300 in FIG. 10, the ship image 303 in FIG. 11, the push-out body images 305 in FIG. 12, and the cannon image 309 in FIG. 13. That is, the operating object is the object of which the motion is controllable by the player.

[Automatic Object Moving Process] The CPU 201 calculates the coordinate of an automatic object, for example, based on a predetermined initial rate. And, the CPU 201 supplies the storage position data of the automatic object and the calculated coordinate data to the graphic processor 202 in a vertical blanking period.

The graphic processor 202 reads the image data of the automatic object from the ROM 53 based on the storage position date supplied, generates an image signal based on the image data read and the coordinate data supplied, and then outputs the image signal to the image signal output terminal 51. Thereby, the moved automatic object is displayed on the screen 101 of the television monitor 100. Thus, the automatic object moves on the screen 101.

Here, the automatic object refers to an object that moves independently of the operation of the handle 7. The automatic objects given as examples are the ship image 302 in FIG. 10, the fish images 304 in FIG. 11, the target image 310 in FIG. 13, and the coin inserting body image 312 in FIG. 14. That is, the automatic object is the object of which the motion is uncontrollable by the player.

[Coin Movement Process] The CPU 201 controls the movement of the coin image 301. For example, the CPU 201 performs the drop processing from when the coin image 301 appears until the coin image 301 contacts another object such as the operating object or the automatic object.

In this case, the CPU 201 calculates the coordinate of the coin image 301, for example, based on a predetermined initial rate. Then, the CPU 201 supplies the storage position data of the coin image 301 and the calculated coordinate data to the graphic processor 202 in a vertical blanking period.

The graphic processor 202 reads the image data of the coin image from the ROM 53 based on the storage position data supplied, generates an image signal based on the image data read and the coordinate data supplied, and then outputs the image signal to the image signal output terminal 51. Thereby, the coin image 301 moved downward is displayed on the screen 101 of the television monitor 100.

Besides, for example, the CPU 201 performs the movement processing after the coin image 301 contacts another object such as the operating object or the automatic object.

In this case as well, similar to the drop processing, the CPU 201 calculates the coordinate of the coin image 301 that is moved. Then, the CPU 201 supplies the storage position data of the coin image 301 and the calculated coordinate data to the graphic processor 202.

The graphic processor 202 reads the image data of the coin image from the ROM 53 based on the storage position data supplied, generates an image signal based on the image data read and the coordinate data supplied, and then outputs the image signal to the image signal output terminal 51. Thereby, the moved coin image 301 is displayed on the screen 101 of the television monitor 100.

[Image Display Control] The CPU 201 also performs control over the display of an image other than the operating object, automatic object, and the coin image. For example, the CPU 201 controls the display of a background image. Besides, for example, the CPU 201 performs the rotation processing for the drum images 315 in FIG. 15.

[Coin Payout Process] When a payout requirement corresponding to each of the game contents is fulfilled, the CPU 201 drives the DC motor 401 based on the control signal c to rotate the rotating disk 32 of the hopper 35. Thereby, the coin 8 is ejected from the coin ejection opening 13 via the guide members 36, 37.

In this case, the CPU 201 counts the coin ejecting detection signals from the input/output control circuit 209, thus counting the number of coins 8 ejected. Upon completing the ejection of the number of coins 8 designated by the game program, the CPU 201 stops the DC motor 401.

[Music Control] The CPU 201 supplies the storage position data of waveform data such as musical sounds, voices, or sound effects to the sound processor 203. The sound processor 203 reads the waveform data from the ROM 53 based on the storage position data supplied, subjects the waveform data to necessary processing to generate a musical sound signal, and then supplies the musical sound signal to the musical sound output terminal 52. Thereby, a sound corresponding to the musical sound signal is output from a speaker, which is not shown, of the television monitor 100.

An example of a flow of processing performed by the game apparatus 1 will now be described using flow charts.

Figure 24:
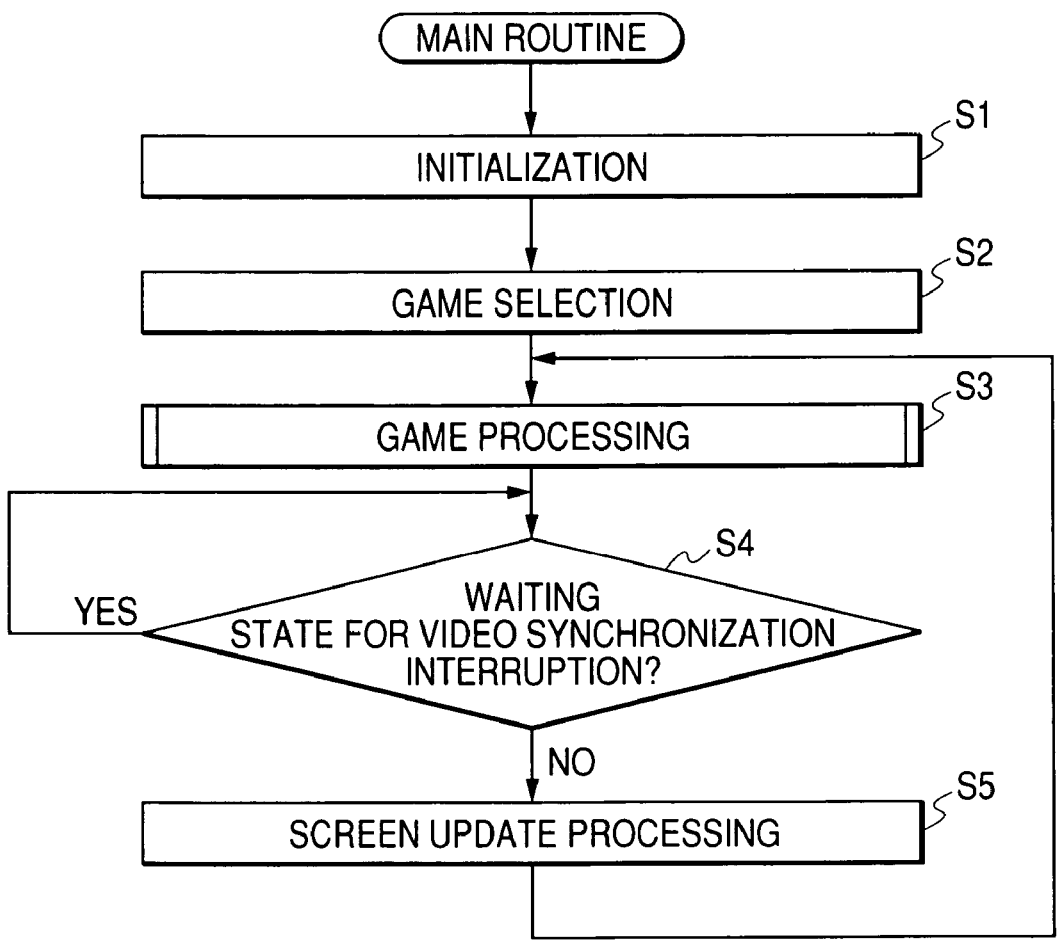
FIG. 24 is a flow chart showing a flow of overall process of the game apparatus in FIG. 1.

FIG. 24 is a flow chart showing a flow of the overall processing of the game apparatus 1. As shown in FIG. 24, in step S1, the CPU 1 executes system initialization.

In step S2, when the player pushes the decision button 5 to determine the selection of a game from the game selection screen in FIG. 9 displayed on the screen 101 of the television monitor 100, then the CPU 201 proceeds to step S3 upon receipt of the input from the decision button 5.

In step S3, the CPU 201 executes the game program of the game selected by the player, which is the game processing.

In step S4, the CPU 201 determines whether a video synchronization interruption is awaited or not. In the embodiment, the CPU 201 supplies the image data to the graphic processor 202 after the start of vertical blanking period, in order to update the display screen of the television monitor 100. Accordingly, the CPU 201 is configured not to allow any further processing until the video synchronization interruption occurs, after completing the calculation for updating the display screen.

When the determination is "YES" in step S4, that is, when the video synchronization interruption is awaited (or if there is no interruption by a video synchronization signal), then the CPU 201 returns to the same step S4. On the contrary, when the determination is "NO" in step S4, that is, when the video synchronization interruption is not awaited (or if there is the interruption by the video sync signal), then the CPU 201 proceeds to step S5. In step S5, the CPU 201 supplies image information such as the storage position data and coordinate data of a display object image, to the graphic processor 202 for updating the screen, and then proceeds to step S3.

Figure 25:
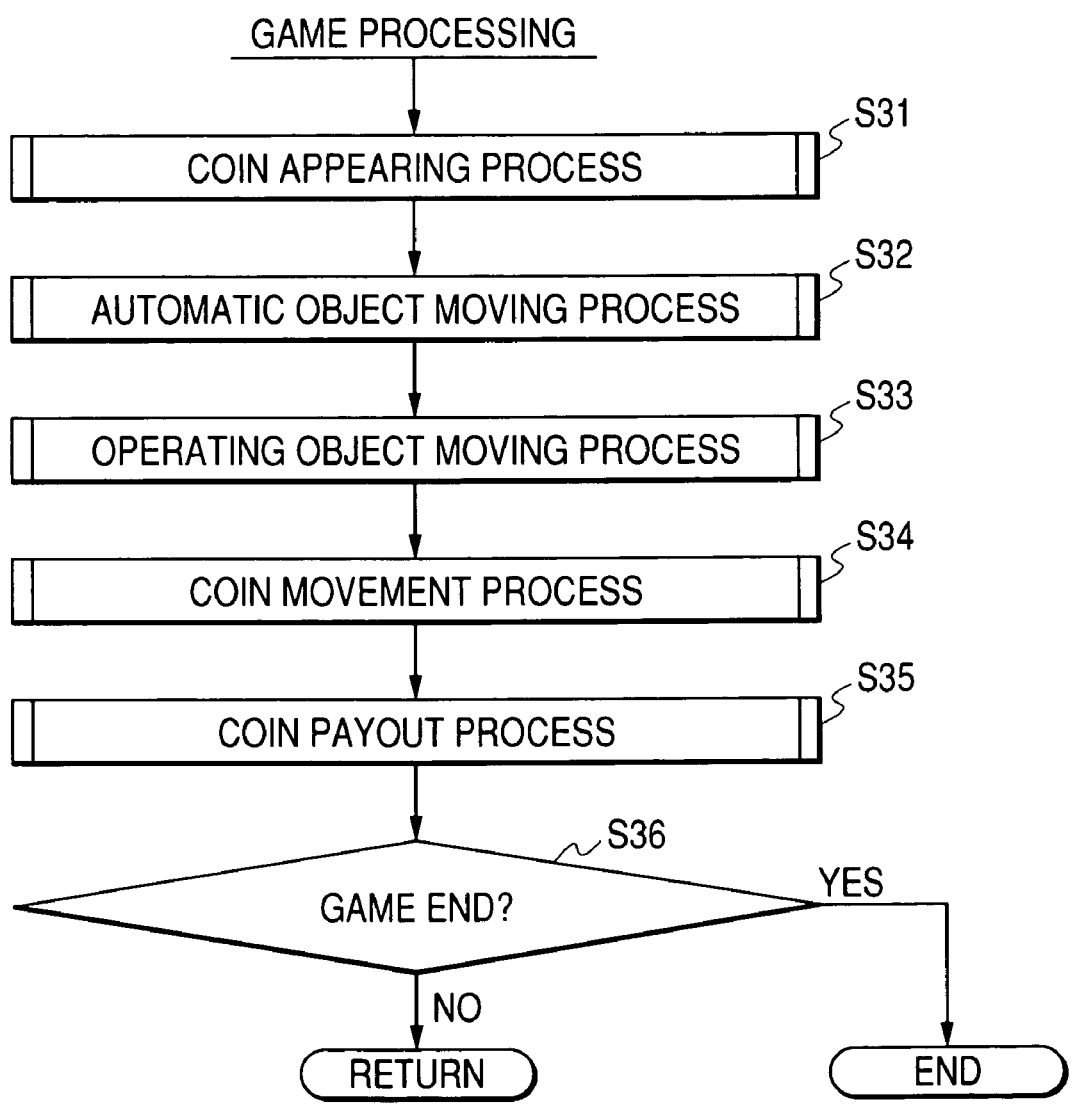
FIG. 25 is a flow chart showing a flow of the game process in step S3 of FIG. 24.

FIG. 25 is a flow chart showing a flow of game processing in step S3 of FIG. 24. This flow chart is applicable to a game processing, such for example as shown in FIGS. 10 to 13, in which a game proceeds while the handle 7 is operated to control the operating object by the player. However, the game in FIG. 12 skips step S32. Besides, processes other than that of step S33 are executed on the game in FIG. 14.

As shown in FIG. 25, in step S31, the CPU 201 performs the process of causing the coin image 301 to appear on the screen 101 synchronized with the insertion of the coin 8.

In step S32, the CPU 201 performs the moving process of the automatic object. In step S33, the CPU 201 performs the process of displacing the operating object according to the rotation of the handle 7.

In step S34, the CPU 201 performs the moving process for the coin image 301. In step S35, when the coin payout requirement is fulfilled, the CPU 201 drives the DC motor 401 to pay out the coin 8 from the coin ejection opening 13.

The CPU 201 returns to a main routine in FIG. 24 when the game is not ended (in step S36), and ends the game when the game is ended (in step S36).

Figure 26:
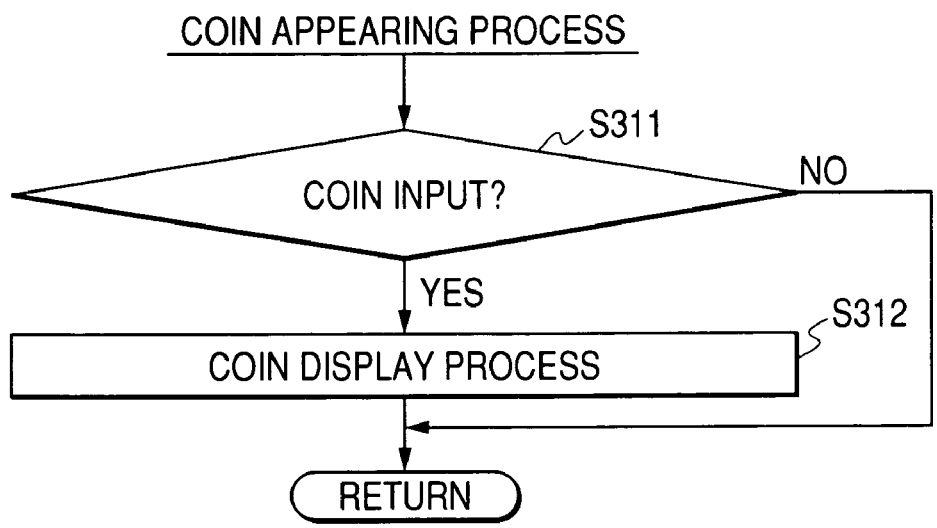
FIG. 26 is a flow chart showing a flow of coin appearance process in step S31 of FIG. 25.

FIG. 26 is a flow chart showing a flow of coin appearing process in step S31 of FIG. 25. As shown in FIG. 26, in step S311, the CPU 201 proceeds to step S312 when the coin 8 is inserted, that is, when the inserted coin detection signal is inputted from the input/output control circuit 209, while the CPU 201 implements the process to step S32 in FIG. 25 when the coin 8 is not inserted. In step S312, the CPU 201 stores the coordinate data indicating the appearance position of the coin image 301 and the storage position data of the coin image 301 into the internal memory 207 to allow the coin image 301 to appear on the screen 101.

Figure 27:
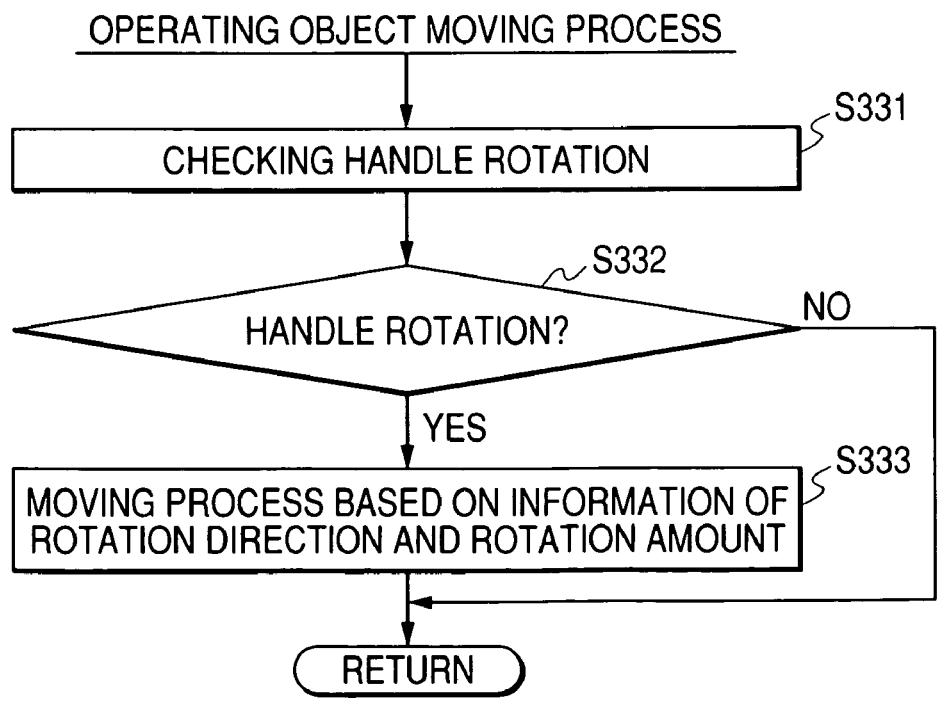
FIG. 27 is a flow chart showing a flow of operating object driving process in step S33 of FIG. 25.

FIG. 27 is a flow chart showing a flow of operating object moving process in step S33 of FIG. 25. As shown in FIG. 27, the CPU 201 checks whether the handle 7 is rotated or not, referring to the register 292 in FIG. 23.

In step S322, the CPU 201 proceeds to step S333 when the handle 7 is rotated, and implements the process to the step S34 in FIG. 24 when the handle 7 is not rotated. Here, the CPU 201 determines that the handle 7 is stationary, for example, when the count value C in the register 292 falls in −2<C<2. In step S333, the CPU 201 stores the coordinate data of the moved operating object and the storage position data of the moved operating object into the internal memory 207, based on the information about the rotation direction and rotation amount of the handle 7. Then, the CPU 201 implements the processing to step S34 in FIG. 25.

Figure 28:
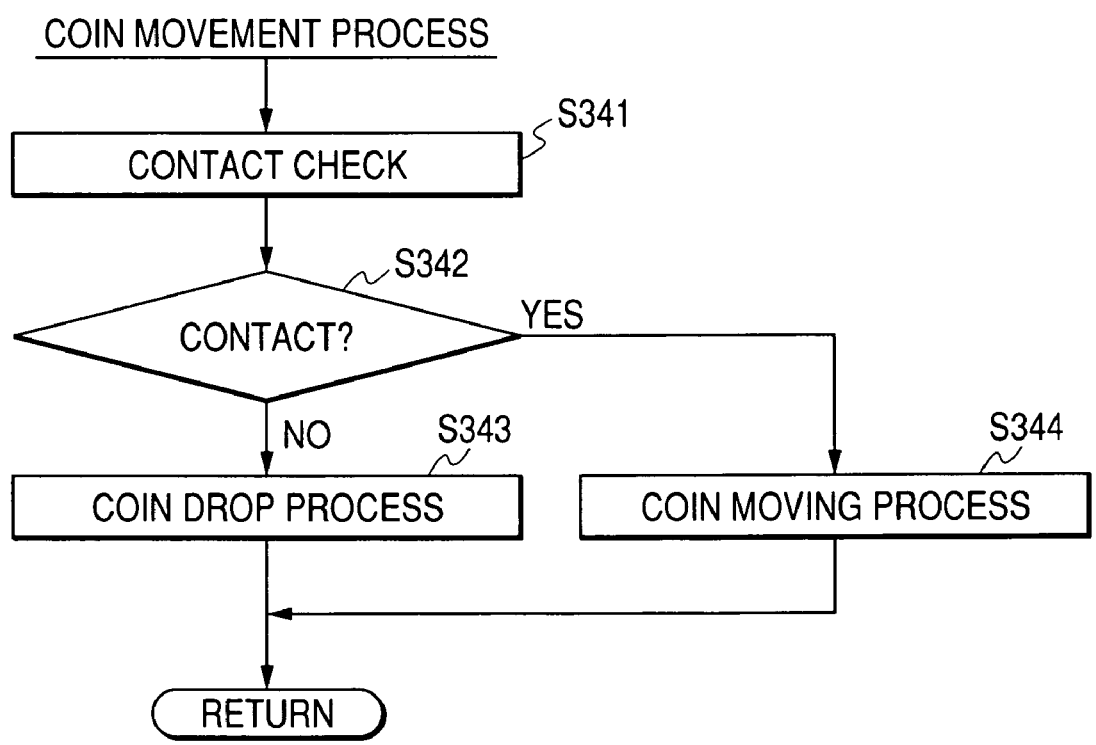
FIG. 28 is a flow chart showing a flow of coin movement process in step S34 of FIG. 25.

FIG. 28 is a flow chart showing a flow of the coin movement process in step S34 of FIG. 25. As shown in FIG. 28, in step S341, the CPU 201 checks whether or not the coin image 301 contacted another object such as the operating object or the automatic object.

In step S342, The CPU 201 proceeds to step S343 when the coin image 301 has not contacted another object such as the operating object or the automatic object, while the CPU 201 proceeds to step 344 when the coin image 301 has contacted another object such as the operating object or the automatic object.

In the step S343, in order to perform the drop process of the coin image 301, the CPU 201 calculates the coordinate of the coin image 301, stores the coordinate data and storage position data of the coin image 301 into the internal memory 207, and then implements the process to step S35 in FIG. 25. On the contrary, in step S344, in order to perform the moving process of the coin image 301 after the contact, the CPU 201 calculates the coordinate of the coin image 301, stores the coordinate data and storage position data of the coin image 301 into the internal memory 207, and then implements the processing to step S35 in FIG. 25.

FIG. 29 is a flow chart showing a flow of the coin payout process in step S35 of FIG. 25. As shown in FIG. 29, the CPU 201 checks whether the coin payout requirement is fulfilled or not in step S351. In step S352, the CPU 201 proceeds to step S36 in FIG. 25 when the payout requirement is not fulfilled, while the process proceeds to step S353 when the payout requirement is fulfilled.

In step S353, the CPU 201 drives the DC motor 401 to eject the coin 8. In step S354, the CPU 201 counts the ejected coin detection signals. In step S355, the CPU 201 proceeds to step S356 when the count value, which is the number of coins ejected, is equal to a prescribed number M of coins paid out, while the CPU 201 proceeds to step S36 in FIG. 25 when the count value is not equal to a prescribed number M of coins paid out.

In step S356, the CPU 201 stops the DC motor 401 and proceeds to step S36 in FIG. 25.

Now, as above, according to the embodiment of the invention, the coin image 301 simulating the coin 8 is displayed on the screen 101 synchronized with the insertion of the coin 8 by the player. Then, the coin image 301 moves on the screen 101. Furthermore, the coin 8 is paid out when the predetermined requirement is fulfilled. Thus, a game is executed with the real world and the game world closely related to each other in a manner that the real coin 8 is inserted, the coin image 301 simulating the real coin 8 moves, and the real coin 8 is paid out. Consequently, the player can be more immersed in the game and can further enjoy the game.

Here, generally when all the steps are executed in a real world in a manner that the real coin is inserted, the real coin moves, and the real coin is paid out, then the game apparatus becomes large in scale. Therefore, the price increases and the device itself increases in size, so that an individual cannot easily purchase the game apparatus and the game cannot be easily enjoyed at home.

In this light, according to the game apparatus of the invention, it is possible to easily enjoy the game adopting the movement of the coin 8, though the coin is an image.

Besides, according to the embodiment of the invention, the player can operate the operating object image using the handle 7 that is rotatable clockwise and counterclockwise. Therefore, this makes it possible to install a larger number of kinds of game programs as compared with when the player can operate the decision button only. As a result, it is possible to provide the game apparatus using a disk body on which device the player can still further enjoy the games.

Additionally, the invention is not limited to the aforesaid embodiment but can be embodied in various modes within the scope not departing from the gist thereof. For example, following modifications are also possible.

(1) In the above description, the coin is cited as an example of the disk body. However, the disk body is not limited thereto but may be a medal for example. Besides, the disk body may be made of any material. For example, the disk body may be made of metal or plastics.

(2) In the above description, six games are cited as examples. However, the game is not limited thereto. Besides, the coin payout requirement can be set at the discretion of game manufacturer.

(3) Any kind of processor can be used as the high-speed processor 50 in FIG. 16, but it is preferred to use the high-speed processor already applied for patent by the present applicant. This high-speed processor is disclosed in, for example, U.S. Pat. No. 6,070,205 corresponding to JP-A-10-307790.

The invention has been described in detail above based on the embodiment, but it will be obvious to those skilled in the art that the invention is not limited to the embodiment described in the present application. The invention can be embodied in modified and changed modes without departing from the spirit and scope of the invention as defined by the appended claims. Accordingly, the description of the invention is intended for purposes of illustration and is in no way intended to limit the invention.

What is claimed is:

1. A game apparatus using a body, said game apparatus comprising:
   a processor operable to execute a game program;
   a body insertion unit into which the body may be inserted by a player;
   a body storage unit operable to store the body therein;
   a payout mechanism operable to pay out the body which is stored in the body storage unit in accordance with a number of bodies to be paid out synchronized with a timing at which a predetermined requirement is fulfilled, and
   an operating information input unit that is rotatable in both clockwise and counterclockwise directions by the operation of the player,
   wherein the processor displays a first object image which is simulating the body and a second object image on a screen, controls movement of the second object image displayed on the screen corresponding to the rotation of the operating information input unit, and controls movement of said first object image in accordance with the movement of the second object image.

2. The game apparatus according to claim 1, further comprising:
   a guide member that is connected to an opening provided in a lower portion of the body storage unit;
   a body ejecting detection unit operable to detect when the body is ejected from the opening to the guide member,
   wherein the body insertion unit comprises a body insertion detection unit operable to detect that the body is inserted into the body insertion unit,
   wherein said body ejecting detection unit comprises:
      a first light emitting element operable to emit light, and
      a first light receiving element operable to detect the light emitted by the first light emitting element,
      said first light emitting element and said first light receiving element being disposed in the guide member so that the light from the first light emitting element is blocked by a part of the body when the body is ejected, and
   wherein the body insertion detection unit comprises:
      a second light emitting element operable to emit light, and
      a second light receiving element operable to detect the light emitted by the second light emitting element, said second light emitting element and said second light receiving element being disposed in the body insertion unit so that the light from the second light emitting element is blocked by a part of the body when the body is inserted.

3. The game apparatus according to claim 2, wherein a body uprise prevention member operable to prevent an uprising of the body is disposed in a lower portion of the body storage unit.

4. The game apparatus according to claim 1, wherein the processor includes a graphic processor operable to generate the first object image, which is supplied with storage position information of image data for generating the first object image during each time of a video blanking period, said graphic processor reading the image data stored in a position indicative of the storage position information, and then generating the first object image.

5. The game apparatus according to claim 1, wherein the processor includes a graphic processor operable to generate the first object image and the second object image, which is supplied with storage position information of image data for generating the first object image and with storage position information of image data for generating the second object image during each time of a video blanking period, said graphic processor reading the image data stored in positions indicative of the respective storage position information, and then generating the first object image and the second object image.

6. The game apparatus according to claim 1, wherein the operating information unit comprises a rotary encoder.

7. The game apparatus according to claim 6, wherein the rotary encoder comprises:
   a disk formed with slits;
   a light emitting element; and
   a light receiving element,
   wherein when the disk is rotated the light receiving element intermittently receives light from the light emitting clement.

8. The game apparatus according to claim 1,
   wherein the body insertion unit includes a body insertion detection unit operable to detect the body when the body is inserted though the body insertion unit,
   wherein the processor displays the first object image which is simulating the body on the screen synchronized with a detection of the insertion of the body by the body insertion detection unit.

9. The game apparatus according to claim 1, wherein the body is disk-shaped.

10. A game apparatus using a body, said game apparatus comprising:
    a processor operable to execute a game program;
    a body insertion unit into which the body is inserted;
    a body storage unit operable to store the body therein;
    a payout mechanism operable to pay out the body stored in the body storage unit, synchronized with a timing at which a predetermined requirement is fulfilled; and
    an operating information input unit, comprising:
       a rotary encoder;
       a stopper; and
       a handle that is rotatable in both clockwise and counterclockwise directions by an operation of a player, wherein the handle comprises a first projection and a second projection, each disposed on the handle,
       wherein clockwise rotation of the handle is limited by interaction between the first projection and the stopper, and counterclockwise rotation of the handle is limited by interaction between the second projection and the stopper, and wherein the processor displays a first object image which is simulating the body and a second object image on a screen, controls movement of the second object image displayed on the screen corresponding to the rotation of the handle of the operating information input unit, and controls movement of said first object image in accordance with the movement of the second object image.

11. The game apparatus according to claim 10, wherein the rotary encoder comprises:
   a disk formed with slits;
   a light emitting element; and
   a light receiving element,
   wherein when the disk is rotated the light receiving element intermittently receives light from the light emitting element.

12. The game apparatus according to claim 10, wherein the body is disk-shaped.

13. A game program embodied in a computer readable medium which enables a computer to perform a process, said process comprising:
   detecting when a body is inserted;
   displaying a first object image which is simulating the body and a second object image on a screen;
   controlling movement of the second object image displayed on the screen corresponding to the rotation of an input unit;
   controlling movement of said first object image in accordance with the movement of the second object image; and
   paying out the body which is stored in a body storage unit when a predetermined requirement is fulfilled.

14. The game program according to claim 13, wherein said input comprises a rotary encoder.

15. The game program according to claim 13, wherein said step of displaying displays the first object image which is simulating the body on the screen synchronized with a detection of the insertion of the body by said step of detecting.

16. The game program according to claim 13, wherein the body is disk-shaped.

17. A game program embodied in a computer readable medium which enables a computer to perform a process, said process comprising:
   detecting when a body is inserted;
   paying out the body stored in a body storage unit, synchronized with a timing at which a predetermined requirement is fulfilled;
   detecting rotation of a handle of an input unit, wherein the input unit comprises:
      a rotary encoder;
      a stopper; and
      the handle, which is rotatable in both clockwise and counterclockwise directions by an operation of a player, wherein the handle comprises a first projection and a second projection, each disposed on the handle,
      wherein clockwise rotation of the handle is limited by interaction between the first projection and the stopper, and counterclockwise rotation of the handle is limited by interaction between the second projection and the stopper; and
   displaying a first object image which is simulating the body and a second object image on a screen;
   controlling movement of the second object image displayed on the screen, corresponding to the rotation of the handle of the input unit;
   controlling movement of said first object image in accordance with the movement of the second object image; and
   paying out the body which is stored in a body storage unit when a predetermined requirement is fulfilled.

18. The game program according to claim 17, wherein the body is disk-shaped.

* * * * *